US012645462B2

(12) United States Patent (10) Patent No.: US 12,645,462 B2
Neumann (45) Date of Patent: Jun. 2, 2026

(54) SYSTEMS AND METHODS FOR GENERATING A PHYSICAL COMBINATION INSTRUCTION SET

(71) Applicant: KPN INNOVATIONS, LLC., Lakewood, CO (US)

(72) Inventor: Kenneth Neumann, Lakewood, CO (US)

(73) Assignee: KPN INNOVATIONS, LLC, Lakewood, CO (US)

( * ) Notice: Subject to any disclaimer, the term of this patent is extended or adjusted under 35 U.S.C. 154(b) by 25 days.

(21) Appl. No.: 18/517,690

(22) Filed: Nov. 22, 2023

(65) Prior Publication Data

US 2024/0095036 A1 Mar. 21, 2024

Related U.S. Application Data

(63) Continuation-in-part of application No. 17/592,010, filed on Feb. 3, 2022, now Pat. No. 11,954,494, which
(Continued)

(51) Int. Cl.
*G06F 17/00* (2019.01)
*G06F 9/38* (2018.01)
*G06N 20/00* (2019.01)

(52) U.S. Cl.
CPC ........... *G06F 9/3853* (2013.01); *G06N 20/00* (2019.01)

(58) Field of Classification Search
CPC ...... G06F 9/3853; G06N 20/00; G06N 20/20; G06N 20/60; G06N 3/0442; G06N 3/094;
(Continued)

(56) References Cited

U.S. PATENT DOCUMENTS 8,200,548 B2 6/2012 Wiedl
10,026,055 B2 7/2018 Riel-Dalpe et al.
(Continued)

OTHER PUBLICATIONS

Laio, Wenzhu et al., "Multi-objective green meal delivery routing problem based on a two-stage solution strategy", Journal of Cleaner Production, ScienceDirect, Jun. 10, 2020, https://www.sciencedirect. com/science/article/pii/S0959652620306740.
(Continued)

*Primary Examiner* — Greta L Robinson
(74) *Attorney, Agent, or Firm* — Caldwell LLC

(57) ABSTRACT

Described herein is a system for determining a physical combination instruction set, which may include a computing device configured to receive a first order for a first alimentary item from a remote device operated by a user; determine an environmental impact estimate as a function of the first order; transmit a signal to the remote device configuring the remote device to display the environmental impact estimate to the user; receive a delivery mode datum from the remote device; determine a physical transfer instruction set as a function of the delivery mode datum, wherein determining the physical transfer instruction set includes determining an area for additional users to submit orders for alimentary items to a cluster; and receiving, as a function of the area, orders for alimentary items; and transmit the physical transfer instruction set to a physical transfer apparatus.

20 Claims, 11 Drawing Sheets

Related U.S. Application Data is a continuation of application No. 17/032,104, filed on Sep. 25, 2020, now Pat. No. 11,256,514.

(58) Field of Classification Search

CPC .... G06N 3/0464; G06N 3/047; G06N 3/0475; G06N 3/084; G06N 3/088; G06N 3/09; G06N 3/0455; G06N 5/01; G06N 7/01; G06Q 10/047; G06Q 10/08355; G06Q 50/12

See application file for complete search history.

(56) References Cited

U.S. PATENT DOCUMENTS

| | | | |
|---|---|---|---|
| 10,168,171 | B2 | 1/2019 | van Dok et al. |
| 10,458,808 | B2 | 10/2019 | Droege et al. |
| 10,671,086 | B2 | 6/2020 | Yao et al. |
| 10,740,715 | B1 | 8/2020 | Kumar et al. |
| 10,885,479 | B1 | 1/2021 | Reiss et al. |
| 10,915,853 | B2 | 2/2021 | Berk et al. |
| 10,977,751 | B1 | 4/2021 | Bernstein et al. |
| 11,256,514 | B1 | 2/2022 | Neumann |
| 2002/0004749 | A1 | 1/2002 | Froseth et al. |
| 2004/0210621 | A1 | 10/2004 | Antonellis |
| 2005/0015281 | A1 | 1/2005 | Clark et al. |
| 2009/0248527 | A1* | 10/2009 | Strimling .......... G06Q 30/0613 705/26.1 |
| 2010/0280895 | A1 | 11/2010 | Mottola |
| 2014/0058794 | A1 | 2/2014 | Malov et al. |
| 2015/0227888 | A1 | 8/2015 | Levanon et al. |
| 2016/0372005 | A1 | 12/2016 | Bajpai et al. |
| 2017/0024789 | A1* | 1/2017 | Frehn .................... G06Q 50/12 |
| 2017/0372197 | A1 | 12/2017 | Baughman et al. |
| 2018/0293638 | A1 | 10/2018 | Simpson |
| 2018/0308066 | A1 | 10/2018 | Hadatsuki |
| 2019/0043143 | A1 | 2/2019 | Camacho et al. |
| 2020/0065892 | A1 | 2/2020 | Brown |
| 2020/0410391 | A1 | 12/2020 | Barrett |
| 2021/0019694 | A1 | 1/2021 | Dhesi et al. |

OTHER PUBLICATIONS

Reyes, Damian et al., "The Meal Delivery Routing Problem", H. Milton Stewart School of Industrial Engineering, Georgia Institute of Technology, Mar. 1, 2018, https://www.semanticscholar.org/paper/The-Meal-Delivery-Routing-Problem-Reyes-Erera/1c0b0f117437f4123cdeb77c24210610733de706.

* cited by examiner

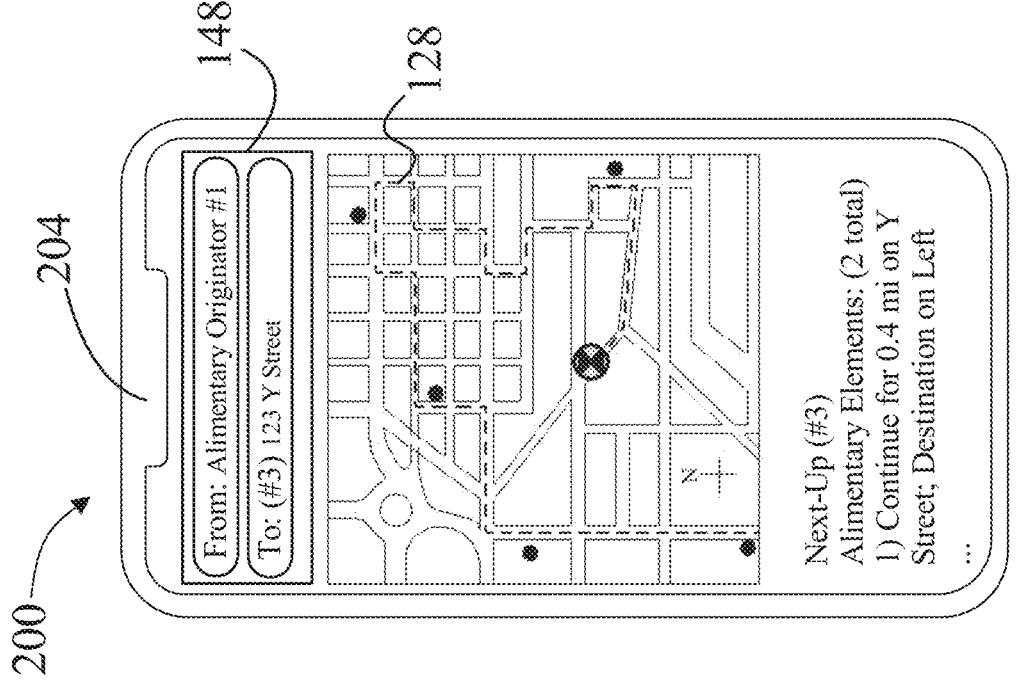

200

204

148

From: Alimentary Originator #1

To: (#3) 123 Y Street

128

Next-Up (#3)
Alimentary Elements: (2 total)
1) Continue for 0.4 mi on Y
Street; Destination on Left
...

From: User #4

To: Physical Transfer Apparatus #2

Alimentary Elements: (2 total)
Cost : $25.00 (tip included)

...
Genreate First Item at 12:00pm
Prepare Second Item at 12:10pm
Pick-up at 12:15pm From: User #1

To: Physical Transfer Apparatus #3

Alimentary Elements: (3 total)
Cost : $50.00 (tip included)

...
Genearate First Item at 12:15 pm
Genearete Second Item at 12:20 pm
Prepare Third Item at 12:25 pm
Pick-up at 12:30 pm

*FIG. 2A*

SYSTEMS AND METHODS FOR GENERATING A PHYSICAL COMBINATION INSTRUCTION SET

CROSS-REFERENCE TO RELATED APPLICATIONS

This application is a continuation-in-part of Non-provisional application Ser. No. 17/592,010, filed on Feb. 3, 2022, and entitled "METHOD OF SYSTEM FOR GENERATING A CLUSTER INSTRUCTION SET," which is a continuation of Non-provisional application Ser. No. 17/032,104 filed on Sep. 25, 2020, and entitled "METHOD OF SYSTEM FOR GENERATING A CLUSTER INSTRUCTION SET", each of which is incorporated herein by reference in its entirety.

FIELD OF THE INVENTION

The present invention generally relates to the field of alimentary item delivery. In particular, the present invention is directed to systems and methods for generating a physical combination instruction set.

BACKGROUND

Efficient path selection using path guidance is an increasingly vital process for provisioning of alimentary elements. However, existing methods for path selection using path guidance suffer from inaccuracy in providing a unifying system for a plurality of users at a single locale placing orders from a plurality of alimentary element originators.

SUMMARY OF THE DISCLOSURE

In an aspect, a system for determining a physical combination instruction set may include a computing device configured to receive a first order for a first alimentary item from a remote device operated by a user; determine an environmental impact estimate as a function of the first order; transmit a signal to the remote device configuring the remote device to display the environmental impact estimate to the user; receive a delivery mode datum from the remote device; determine a physical transfer instruction set as a function of the delivery mode datum, wherein determining the physical transfer instruction set includes determining an area for additional users to submit orders for alimentary items to a cluster; and receiving, as a function of the area, orders for alimentary items; and transmit the physical transfer instruction set to a physical transfer apparatus.

In another aspect, a method of determining a physical combination instruction set may include, using at least a processor, receiving a first order for a first alimentary item from a remote device operated by a user; using at least a processor, determining an environmental impact estimate as a function of the first order; using at least a processor, transmitting a signal to the remote device configuring the remote device to display the environmental impact estimate to the user; using at least a processor, receiving a delivery mode datum from the remote device; using at least a processor, determining a physical transfer instruction set as a function of the delivery mode datum, wherein determining the physical transfer instruction set includes determining an area for additional users to submit orders for alimentary items to a cluster; and receiving, as a function of the area, orders for alimentary items; and using at least a processor, transmitting the physical transfer instruction set to a physical transfer apparatus.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 2A-2B are diagrammatic representations of exemplary embodiments of a user device for providing a cluster instruction set;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating a cluster instruction set. In an embodiment, a computing device is configured to receive a cluster of a plurality of alimentary elements from at least a user destined for a single locale. Computing device may be configured to notify a plurality of users at the single locale, via a graphical user interface, to submit additional alimentary elements to the cluster according to each user's unique alimentary element program. Computing device may utilize a machine-learning process and an objective function, to generate a plurality of physical transfer paths as a function of a plurality of constraints involved in the physical transfer process. Computing device may rank the plurality of physical transfer paths using a ranking machine-learning process which using a ranking function for each physical transfer path as a function of the physical transfer resources and time required. Computing device may determine a physical transfer pattern by selecting a physical transfer path as a function of the ranking and generating a cluster instruction set. Cluster instruction set may contain alimentary element originator-specific and physical transfer apparatus-specific instructions. Computing device is configured to generate a representation of the cluster instruction set via a graphical user interface to at least a physical transfer apparatus and the plurality of alimentary element originators.

Figure 1:
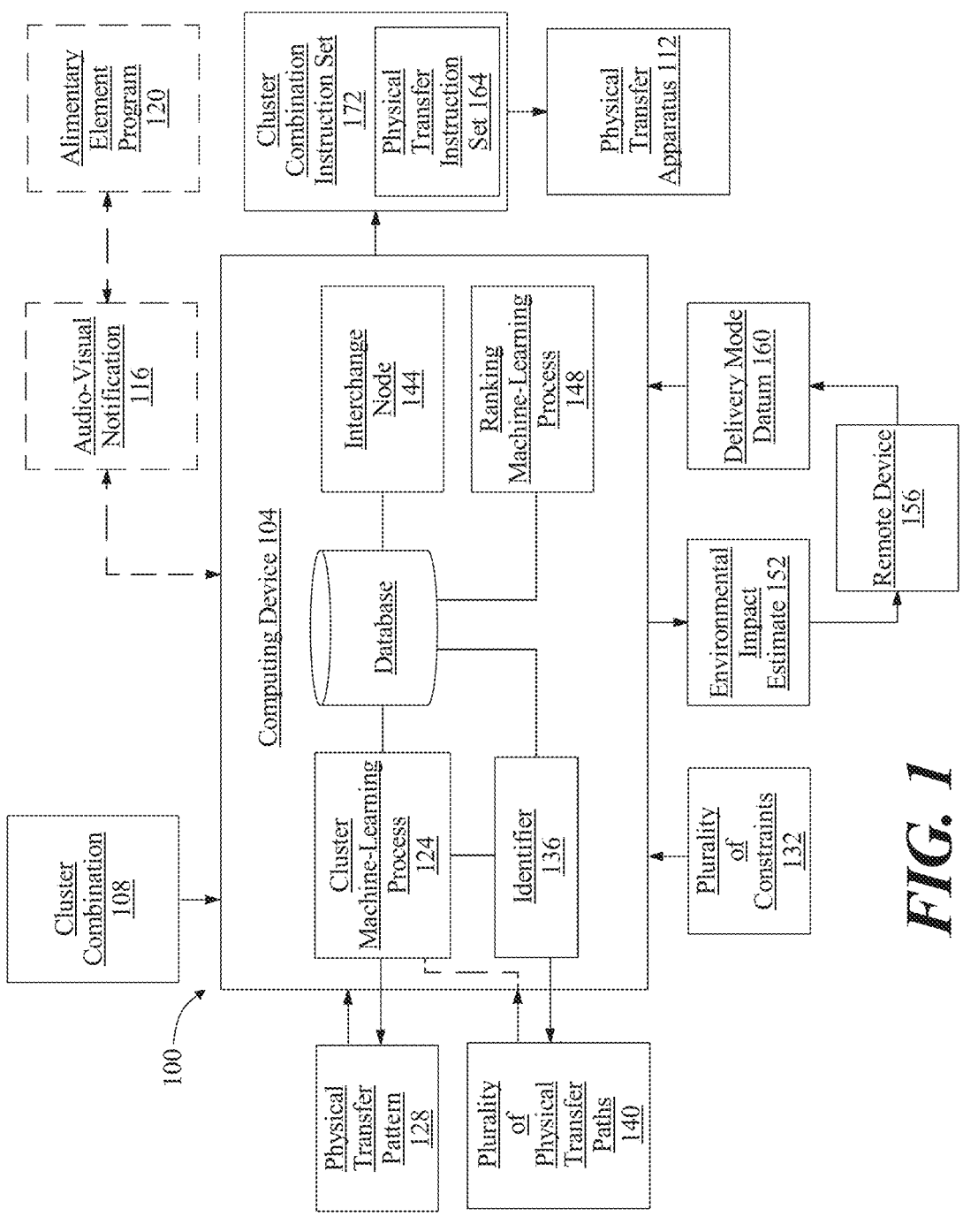
FIG. 1 is a block diagram of an exemplary embodiment of a system of generating a physical combination instruction set.

Referring now to FIG. 1, an exemplary embodiment of a system 100 for generating a cluster instruction set is illustrated. System includes a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

Continuing in reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing in reference to FIG. 1, computing device 104 may be configured to receive a cluster of a plurality of alimentary elements for physical transfer to a single locale. An "alimentary element," as used in this disclosure, is a datum regarding a meal, grocery item, food element, nutrition supplement, edible arrangement, or the like, that may be generated by a restaurant, cafeteria, fast food chain, grocery store, food truck, farmer's market, proprietor, convenience store, deli, or any place that would have a need for providing an alimentary item to a customer, client, patient, or individual. A "cluster," as used in this disclosure, is a plurality of alimentary elements, associated with a plurality of orders, destined for a single locale at the same time. A cluster 108 may be a series of distinct alimentary elements for a plurality of users and/or a single user destined to a singular place. A cluster 108 may contain alimentary elements that originate from a plurality of establishments, for instance and without limitation, restaurants, grocery stores, food trucks, fast food chains, convenience stores, and the like, including a plurality of each and/or any combination thereof. In non-limiting illustrative examples, a cluster 108 may be a burger from a fast food chain, a fruit tray from a grocery store, candied yams from a gas station, an entrée from a restaurant, and a protein drink from a health food store, wherein the alimentary elements are destined to a single office building for a plurality of individuals. In further non-limiting illustrative examples, a cluster 108 may include an order of boneless chicken wings from a restaurant, a case of drinks from a grocery store, and a pizza from a fast food chain ordered by a single user and destined for a single residence.

Still referring to FIG. 1, computing device 104 may receive an order for one or more alimentary elements. In some embodiments, computing device 104 may receive an order for a cluster of alimentary elements. An order for an alimentary element or a cluster of alimentary elements may be received from a remote device 156. Similarly, computing device 104 may receive a provisional order for an alimentary element and/or a cluster of alimentary elements. As used herein, a "provisional order" is a datum indicating that a user desires an item. Provisional orders may include, in non-limiting examples, placing an item into a virtual shopping cart, selecting an item on a virtual menu, and the like. A provisional order may be received from remote device 156. Remote device 156 may include, in non-limiting examples, a smartphone, tablet, computer, smartwatch, kiosk, and the like.

Continuing in reference to FIG. 1, a "physical transfer apparatus," as used in this disclosure is any apparatus suitable for use as a computing device, and that is associated with, incorporated in, and/or operated by user, a vehicle, bike, drone, robot, autonomous vehicle, car, truck, etc. that is physically exchanging an alimentary element from the originator to the user. A physical transfer apparatus 112 may include a vehicle operated by an individual to receive and physically transfer alimentary elements. A physical transfer apparatus 112 may be an electric-powered drone or robot that is equipped to pick up alimentary element packages for physical transfer.

Continuing in reference to FIG. 1, receiving a cluster 108 of a plurality of alimentary elements for physical transfer to a single locale may include generating an audiovisual notification in response to receiving the cluster 108. An "audiovisual notification," as used in this disclosure is a notification including a graphical, textual, or audio element that is displayed to a user operating remote device 156. Non-limiting examples of remote devices 156 and/or features of remote devices which may display an audiovisual notification include a graphical user device, a smartphone, a heads-up display, a laptop, a tablet, an internet-of-things (JOT) device, and the like. Audiovisual notification 116 may be displayed via a graphical user interface, wherein the audiovisual notification 116 may include information about submitting to the cluster 108 as a function of an alimentary element program. An audiovisual notification 116 may include an alert that notifies a user that others at their location corresponding to building a cluster 108 of alimentary elements. A user may receive an audiovisual notification 116 that notifies the user on the status of at least an alimentary element that is part of a cluster 108, wherein the status is information regarding the alimentary element location, physical transfer apparatus, the status of the physical transfer, and the like. An audiovisual notification may be communicated to a user using remote device 156.

Still referring to FIG. 1, computing device 104 may determine an environmental impact estimate 152. As used herein, an "environmental impact estimate" is an estimate of the environmental impact of at least a component of an order or provisional order. Environmental impact estimate 152 may be determined as a function of an order and/or a provisional order. In some embodiments, determining environmental impact estimate 152 may include determining a carbon emission estimate of a physical transfer pattern used to deliver alimentary item and/or cluster of alimentary items. In some embodiments, such an estimate may be based on anticipated future conditions. This may be calculated by, for example, estimating the carbon emissions of a vehicle travelling along a route in order to deliver an order. Such a calculation may take into account, in non-limiting examples, the type of vehicle used, traffic patterns, the number of orders being delivered by the vehicle, the type of fuel used, and the like. In some embodiments, determining environmental impact estimate 152 may include determining environmental impacts associated with additional steps of producing alimentary items, such as production of ingredients, delivery of ingredients to a location where an alimentary item is prepared, type and quality of ingredients, where ingredients are produced, whether ingredients would be wasted if not quickly used, and the like. In some embodiments, environmental impact estimate 152 may take into account travel before pickup of an alimentary item. For example, computing device 104 may gather data on a distance of a driver from a pickup location, a gas mileage of a vehicle operated by the driver, traffic conditions, and other relevant variables, and may use this data to estimate fuel emissions of a driver travelling to a pickup location in order to pick up an alimentary item for delivery. In some embodiments, determining environmental impact estimate 152 may include identifying ingredients used in an alimentary item and using a lookup table to identify a per ingredient environmental impact. In some embodiments, environmental impact estimate 152 may include categorizing alimentary items and/or ingredients of alimentary items, and estimating their environmental impact based on the categorization. Such classification may be done using a classifier. In a non-limiting example, an alimentary item may be categorized, using a classifier, into a "burger" category, and computing device 104 may determine environmental impact estimate 152 based on this categorization. In some embodiments, environmental impact estimate 152 may be determined using a generative machine learning model. For example, computing device 104 may input a question asking about the environmental impact of an alimentary item, ingredient, and/or category into a generative machine learning model and may take an output into account when determining environmental impact estimate 152.

Still referring to FIG. 1, in some embodiments, an alimentary element environmental impact machine learning model may be used to determine environmental impact estimate 152. Alimentary element environmental impact machine learning model may be trained on a training dataset including alimentary elements, associated with the environmental impact of their production. Such a training dataset may be gathered, for example, from reports of entities which measure environmental impacts of various alimentary items. Once alimentary item environmental impact machine learning model is trained, it may accept, as an input, an alimentary element, and may output an estimate of the environmental impact of the production of the input alimentary element. This may be used as a component of environmental impact estimate 152.

Still referring to FIG. 1, in some embodiments, environmental impact estimate 152 may be compared to a threshold, such as an average environmental impact of a meal. In some embodiments, multiple environmental impact estimates 152 may be compared. In non-limiting examples, environmental impact estimates 152 for multiple delivery options may be calculated and/or environmental impact estimates 152 for multiple alimentary items may be calculated. In a non-limiting example, environmental impact estimates 152 for multiple delivery modes such as delivery of a single order vs a group of orders, delivery via car vs via bike, delivery vs pickup, and delivery to a first location vs delivery to a second location may be calculated and/or displayed to a user.

Still referring to FIG. 1, in some embodiments, environmental impact estimate 152 may be displayed to a user. For example, computing device 104 may transmit a signal to remote device 156 operated by a user configuring remote device 156 to display to the user one or more environmental impact estimates 152. In some embodiments, environmental impact estimates 152 and/or changes in environmental impact estimates may be displayed such that they are associated with orders, provisional orders, alimentary items, and/or choices relating to an order of alimentary items. In some embodiments, one or more environmental impact estimates 152 may be displayed as part of an audiovisual notification as described above. In some embodiments, a low environmental impact estimate delivery mode may be suggested to a user and/or selected as a default option.

Still referring to FIG. 1, in some embodiments, computing device 104 may determine a demand estimate. As used herein, a "demand estimate" is an estimate of the amount of orders to be delivered at a certain time. A demand estimate may be determined based on past ordering trends. For example, a demand estimate may be based on an average number of orders at a specific time of day and day of the week over the past month. A demand estimate may be specific to a region. In some embodiments, computing device 104 may transmit to remote device 156 a signal configuring remote device 156 to display a demand estimate. A demand estimate may be used to, for example, identify times when other users are likely to order, promoting combining delivery of orders at those times. In another example, a demand estimate may be used to identify times when other users are unlikely to order, promoting individual delivery or no delivery at those times. In some embodiments, a demand estimate may be used to determine whether an alimentary item is to be delivered alone or as part of a larger group of alimentary items. For example, if a demand estimate suggests that an alimentary item is to be delivered at a high demand time, then the alimentary item may be delivered using the same mode of transportation as one or more other alimentary items. In some embodiments, environmental impact estimate 152 may be modified as a function of a demand estimate. For example, if a demand estimate predicts high demand at a particular time, then an order scheduled for that time, with a delivery mode that allows for group delivery, may be associated with a lower environmental impact estimate 152 than a similar order at a time when a demand estimate is lower.

Still referring to FIG. 1, in some embodiments, computing device 104 may be configured to receive a delivery mode datum 160. A delivery mode may be received from remote device 156 operated by a user. As used herein, a "delivery mode datum" is a datum indicating a user preference as to how an alimentary item is delivered. In some embodiments, a user may make a delivery mode selection using remote device 156, and remote device 156 may transmit to computing device 104 delivery mode datum 160. In a non-limiting example, delivery mode datum 160 may indicate a transportation method to be used for delivery of an alimentary item to a user, such as by car or by bike. In another non-limiting example, delivery mode datum 160 may indicate whether an alimentary item is to be delivered by itself or in combination with one or more additional alimentary items. For example, computing device 104 may configure remote device 156 to present to a user a plurality of options on when an alimentary item should be delivered. Such options may be displayed alongside environmental impact estimates 152. For example, an option may configure computing device 104 to wait before delivering an alimentary item. Waiting may allow for additional orders to be placed for delivery to the same location or area, allowing multiple orders to be delivered using the same mode of delivery. In some embodiments, waiting time may last until there are a certain number of outstanding orders to be delivered to the same location (or to within an area), and having the order delivered then. In some embodiments, waiting time may have a cap. Selection of an option including waiting time may reduce an environmental impact of a delivery, as it may allow for multiple alimentary items to be delivered at once.

Still referring to FIG. 1, in some embodiments, delivery mode datum 160 may include an urgency datum. As used herein, an "urgency datum" is a datum indicating a degree of urgency with which an alimentary item is to be delivered. In a non-limiting example, remote device 156 may present multiple options to a user, and a user may select a degree of urgency from the presented options. In some embodiments, an urgency datum may impact a determination as to a delivery mode. For example, an alimentary item to be delivered immediately may be delivered without first waiting for other orders in the same area to be placed. In another example, an alimentary item to be delivered at a certain time may be delivered using the same vehicle or other mode of transportation as one or more other orders to be delivered to the same area at the same time.

Still referring to FIG. 1, in some embodiments, computing device 104 may determine an area for additional users to submit orders for alimentary items to a cluster. This may occur, for example, when a first user selects an option including a wait time as described above. In some embodiments, an area for additional users to submit orders for alimentary items may include an area within a specific radius. In some embodiments, an area may be based on features of a drop off location. For example, if a drop off location is an address of an apartment building, then an area may be determined such that the entire apartment building is within the area. An area may be determined based on factors such as population density, walkability of the vicinity, which region the area is in, and the like. For example, an area may be determined to be larger in a first country than a second country, where customs of the first country are more suitable for large group delivery. In some embodiments, computing device 104 may notify additional users in an area for additional users to submit orders for alimentary items to a cluster that they may submit orders in this way. In a non-limiting example, computing device 104 may determine an area as a function of a first user's order and an associated delivery mode datum 160. Computing device 104 may suggest a delivery mode associated with the first user to a second user ordering an alimentary item to be delivered within the area. Such a suggestion may include a notification that the delivery mode is a group delivery mode. In some embodiments, computing device 104 may calculate environmental impact estimate 152 for one or more delivery modes associated with such a second user. A delivery mode associated with another user may have a reduced environmental impact estimate 152 due to efficiency from delivery of multiple alimentary items using a single delivery mode. In some embodiments, computing device 104 may receive one or more orders for alimentary items as a function of an area for additional users to submit orders for alimentary items to a cluster. In some embodiments, computing device 104 may configure a first user's remote device 156 to display a reduced environmental impact estimate 152 upon a second user joining a delivery mode associated with the first user.

Continuing in reference to FIG. 1, an "alimentary element program," as used in this disclosure, is a plurality of alimentary elements that a user may be informed to select based on a user's biological extraction data. An alimentary element program 120 may include, for instance and without limitation, an instruction set that a computing device 104 may provide to a user, via a graphical user interface, concerning alimentary elements that may improve user's biological extraction parameters. An alimentary element program 120 may include alimentary elements a user is expected to substitute to avoid ailments such as allergy, food intolerances, inflammation, and the like. An alimentary element program 120 may include alimentary elements a user is expected to include in their diet to address nutrition deficiencies, symptoms, diseases, and the like. In non-limiting illustrative examples, an alimentary element program 120 may be associated with an audiovisual notification, wherein the notification contains an alimentary element obtained from the alimentary element program 120. An alimentary element program 120 may be an alimentary element instruction set, as described above, and/or as described in U.S. Nonprovisional application Ser. No. 16/375,303, filed on Apr. 4, 2019, and entitled "SYSTEM AND METHODS FOR GENERATING ALIMENTARY INSTRUCTION SETS BASED ON VIBRANT CONSTITUTIONAL GUIDANCE," the entirety of which is incorporated herein by reference.

Continuing in reference to FIG. 1, "biological extraction data," as used in this disclosure is any biological, chemical, physiological, etc. data that is associated with and/or generated by the user. Biological extraction data may include medical histories, diseases, surgeries, injuries, symptoms, exercise frequency, sleep patterns, lifestyle habits, and the like, that may be used to inform a user's diet. Biological extraction data may include diet information such as nutrition deficiencies, food intolerances, allergies, and the like. Biological extraction data may alternatively or additionally include any data used as a biological extraction as described in U.S. Nonprovisional application Ser. No. 16/502,835, filed on Jul. 3, 2019, and entitled "METHODS AND SYSTEMS FOR ACHIEVING VIBRANT CONSTITUTION BASED ON USER INPUTS," the entirety of which is incorporated herein by reference.

Continuing in reference to FIG. 1, the audiovisual notification 116 may address a user to submit an alimentary element to the cluster 108, wherein the alimentary element corresponds to an alimentary element program 120. Audiovisual notification 116 may be transmitted via a graphical user interface to each user of the plurality of users about submitting suitable alimentary elements to the cluster combination, wherein the alimentary elements correspond with their respective alimentary element programs 120. A "suitable alimentary element," as used in this disclosure, is an alimentary element that a user may select as a function of an alimentary element program 120. A user may receive an audiovisual notification 116 concerning a cluster 108 at their location, wherein the cluster 108 may be a queue that a plurality of users that have been notified to for submitting an alimentary element. A user may receive an audiovisual notification 116, wherein the notification directs the user to at least a suitable alimentary element to add to the cluster 108. Computing device 104 may be configured to send the notification and retrieve, for instance from a database, at least a suitable alimentary element for a user.

Continuing in reference to FIG. 1, computing device 104 may be configured to determine, as a function of a plurality of physical transfer paths, a physical transfer pattern. Cluster machine-learning process 124 may be any machine-learning algorithm performed by a machine-learning module, as described in further detail below. A "physical transfer pattern," as used in this disclosure, is a determined physical transfer path for at least a physical transfer apparatus to follow for obtaining all alimentary elements from all alimentary element originators for physical transfer to a single final location, including the number of physical transfer apparatuses, the order in which the alimentary elements are to be obtained, and the transfer paths that all items are intended to follow over a defined time, the location and time of any interchange nodes, and the times at which the alimentary element originators are to generate each alimentary element. A "physical transfer path," as used in this disclosure, is a path that a physical transfer apparatus may follow. A physical transfer path may be simply referred to, for the purposes of this disclosure, as a "transfer path." An "alimentary element originator," as used in this disclosure, is an entity that may prepare and/or generate an alimentary element for pickup by a physical transfer apparatus, as indicated here, such as a restaurant, fast food chain, grocery store, food truck, and the like. An alimentary element originator may be simply referred to for the purposes of this disclosure as an "originator". An alimentary element originator may include a stationary originator and/or an originator with a specific location. An alimentary element originator may include an individual and/or a business.

Continuing in reference to FIG. 1, a physical transfer path may differ in nature depending on the type of physical transfer apparatus 112 indicated; for instance and without limitation a physical transfer path for a drone may include straight-line paths across a city, whereas a transfer path for a vehicle may abide by a city's street grid and transportation infrastructure. A physical transfer pattern 128 may include a single physical transfer path for a single physical transfer apparatus and/or a plurality of physical transfer apparatuses 112. A physical transfer pattern 128 may include a plurality of physical transfer paths for a single physical transfer apparatus 112 and/or a plurality of physical transfer apparatuses 112. Cluster machine-learning process 124 may accept an input that is a cluster 108, wherein the cluster 108 contains a plurality of alimentary elements and a plurality of alimentary element originators and a single final physical transfer location, and generate an output which is a physical transfer pattern 128. Cluster machine-learning process 124 may generate a plurality of physical transfer patterns 128, wherein the physical transfer patterns 128 may differ in the number of resources used, for instance and without limitation, the number of physical transfer apparatuses 112 used, the lengths of and/or number of the transfer paths, the order in which alimentary elements are picked-up and/or generated, and the like.

Continuing in reference to FIG. 1, determining the physical transfer pattern 128 includes generating a plurality of physical transfer paths using a cluster machine-learning process 124, wherein the cluster machine-learning process generates at least a physical transfer path for each alimentary element of the cluster. Using the cluster machine-learning process 124 to generate a plurality of physical transfer paths to the single locale may include generating the physical transfer paths given a plurality of constraints. A "plurality of constraints," as used in this disclosure, is a plurality of resource constraints, both physical and non-physical, that a machine-learning process uses to determine a physical transfer pattern 128 and to optimize a physical transfer path. A plurality of constraints 132 may include physical resource constraints such as the number of physical transfer apparatuses 112, the availability of physical transfer apparatuses 112, geophysical data regarding each physical transfer apparatus 112, the status of each alimentary element at each originator, etc. A plurality of constraints 132 may include non-physical resources constraints such as times, for instance and without limitation, the time elapsed since a cluster 108 is placed to a plurality of originators, expected times of arrival of physical transfer apparatuses 112, and/or times required for each physical transfer apparatus 112 to obtain each alimentary element to its associated location. Physical transfer patterns 128 may differ in the navigation of the plurality of constraints, for instance and without limitation, making use of a single physical transfer apparatus 112 versus a plurality of physical transfer apparatuses 112, wherein subsequent physical transfer patterns 128 will have fewer available physical transfer apparatuses 112. In non-limiting illustrative examples, a plurality of physical transfer patterns 128 may differ in the amount of time required to complete physical transfer, wherein a first physical transfer pattern 128 may have an alimentary element order that minimizes standby time and a second physical transfer pattern 128 minimizes driving distances. In further non-limiting illustrative examples, a plurality of physical transfer patterns 128 may differ in which physical transfer apparatuses 112 are selected and assigned to which transfer paths, for instance physical transfer apparatuses 112 whose geophysical locations indicate closer starting proximity versus those which are more distant.

Continuing in reference to FIG. 1, the plurality of constraints 132 may include geophysical data regarding each physical transfer apparatus. "Geophysical data," as used in this disclosure is an address, longitude and/or latitude position, global position system (GPS) coordinates, or the like, that system 100 may use to identify the physical location of a physical transfer apparatus, alimentary element, alimentary element originator, user, and the like. Geophysical data regarding each physical transfer apparatus may include a "status" of each physical transfer apparatus, wherein the status may include an indication that a physical transfer apparatus is nearby an alimentary element and/or suitable to retrieve alimentary element.

Continuing in reference to FIG. 1, using a cluster machine-learning process 124 to determine a physical transfer pattern 128 may include generating an identifier for each alimentary element of a cluster 108 of a plurality of alimentary elements. An "identifier," as used in this disclosure, is a qualitative and/or quantitative signifier for an alimentary element that includes a package of data relevant to a machine-learning process for tracking the identity of the alimentary element and the associated data that places the alimentary element within the context of all other alimentary elements of the cluster combination. Identifier 136 may include data regarding submission timestamp, user identity, and a designation of an alimentary element originator. In non-limiting exemplary embodiments, an identifier 136 may include the identity of the alimentary element; the identity of the associated user; the identity and location of the associated alimentary element originator; the timestamp at which the order was submitted to a cluster 108; the timestamp of when the alimentary element should be prepared and/or generated by the alimentary element originator; the timestamp of when a physical transfer apparatus should pick-up an alimentary element from the originator; the timestamp of when an alimentary element is expected to arrive to a user; the position of an alimentary element in a cluster 108, for instance alimentary element 1 of 11 in the cluster 108; the position of an alimentary element in a cluster 108 of a particular alimentary element originator, for instance alimentary element 1 of 3 from alimentary element originator #1. In non-limiting illustrative examples, cluster machine-learning process 124 may accept all the above pieces of data as inputs and generate an identifier 136 which includes data attached to each alimentary element in a physical transfer pattern 128. In further non-limiting illustrative examples, some data in an identifier 136, such as expected timestamps, may change between physical transfer patterns 128, depending on the plurality of constraints 132 and/or when a alimentary element is expected to be prepared by an originator, received by a physical transfer apparatus 112, and the like.

Continuing in reference to FIG. 1, using a cluster machine-learning process 124 to determine a physical transfer pattern 128 may include determining, using the identifier 136 and the objective function, when each alimentary element originator should generate each alimentary element as a function of the plurality of constraints and the plurality of physical transfer paths. In non-limiting exemplary embodiments, computing device 104 may compute a score associated with each physical transfer pattern 128 and select alimentary element order of pick-up and/or order of preparation, physical transfer apparatus 112, number of physical transfer apparatuses 112, and the like, to minimize and/or maximize the score, depending on whether an optimal result is represented, respectively, by a minimal and/or maximal score; a mathematical function, described herein as an "objective function," may be used by computing device 104 to score each possible pairing. Objective function may be based on one or more objectives, as described below. Computing device 104 may pair a predicted transfer path 128, with a given physical transfer apparatus 112, that optimizes the objective function. In various embodiments, a score of a particular physical transfer pattern 128 may be based on a combination of one or more factors, including a plurality of constraints 132. Each factor may be assigned a score based on predetermined variables. In some embodiments, the assigned scores may be weighted or unweighted.

Continuing in reference to FIG. 1, computing device 104 configured to determining the physical transfer pattern includes generating an objective function of the plurality of physical transfer paths as a function of a plurality of constraints, wherein minimizing the objective function minimizes the plurality of physical transfer resources. As used in this disclosure, "minimizing" signifies minimizing a difference from a goal representing a best solution, where the goal could be a maximal output, minimal output, or target number/set of numbers. Minimizing and/or optimizing an objective function may include minimizing the quantity of physical resources used, minimizing time for physical transfer, and the like. Alternatively or additionally, minimizing physical resources used may refer to optimizing an objective function to achieve a maximal score, such as a maximal score in pairing an interchange node time and location to a plurality of transfer paths. Minimizing physical resources may refer to optimizing an objective function to achieve a specific range of values, or the like, wherein the optimal solution is not a minimal value.

With continued reference to FIG. 1, minimization of objective function may include performing a greedy algorithm process. A "greedy algorithm" is defined as an algorithm that selects locally optimal choices, which may or may not generate a globally optimal solution. For instance, computing device 104 may select physical transfer apparatus so that scores associated therewith are the best score for each alimentary element transfer path and/or for each physical transfer apparatus 112 and/or plurality of physical transfer apparatuses 112. In such an example, optimization of a greedy algorithm may determine the combination of transfer paths such that each delivery of each pairing includes the highest score possible but may not represent a globally optimal solution for the entire cluster combination.

Still referring to FIG. 1, objective function may be formulated as a linear objective function, which computing device 104 may solve using a linear program such as without limitation a mixed-integer program. A "linear program," as used in this disclosure, is a program that optimizes a linear objective function, given at least a constraint. For instance, the availability of physical transfer apparatuses, the geophysical location of physical transfer apparatuses, the order with which physical transfer apparatuses should pick-up alimentary elements, when an alimentary element originator should generate an alimentary element, among other constraints. In various embodiments, system 100 may determine a physical transfer pattern 128 that maximizes a total score subject to a constraint, as described above. A mathematical solver may be implemented to solve for the set of physical transfer patterns 128 that maximizes scores; mathematical solver may implement on computing device 104 and/or another device in system 100, and/or may be implemented on third-party solver.

With continued reference to FIG. 1, optimizing objective function may include minimizing a loss function, where a "loss function" is an expression an output of which an optimization algorithm minimizes to generate an optimal result. As a non-limiting example, computing device 104 may assign variables relating to a set of parameters, which may correspond to score components as described above, calculate an output of mathematical expression using the variables, and selects a physical transfer pattern 128 that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs.

Continuing in reference to FIG. 1, objective function, as used in this disclosure, may refer to a program that optimizes a linear objective function, given at least a constraint. For instance, and without limitation, objective function may seek to maximize a total score $\Sigma_{r \in R} \Sigma_{s \in S} c_{rs} x_{rs}$, where R is the set of all physical transfers patterns r, S is a set of all alimentary elements of a cluster 108 s, $c_{rs}$ is a score of a pairing of a given transfer path with a given combination of alimentary elements, and $x_{rs}$ is 1 if a route r is paired with physical transfer apparatus 112 s, and 0 otherwise. Continuing the example, constraints may specify that each alimentary element is assigned to only one physical transfer apparatus 112, and each batch is assigned only one physical transfer apparatus 112. Physical transfer patterns 128 may be optimized for a maximum score combination of all generated combinations, with selection based on a value indicating an optimized combination. In various embodiments, system 100 may determine combination of alimentary element transfer paths, originator times, and physical transfer apparatus 112 assignment, and the like, that maximizes a total score subject to a plurality of constraint that all deliveries are paired to exactly one physical transfer apparatus 112. Not all physical transfer apparatuses 112 may receive a physical transfer pattern 128 pairing since each delivery may only be delivered by one physical transfer apparatus 12; likewise, a physical transfer pattern may receive a more optimal scoring by assigning more physical transfer apparatuses 112. A mathematical solver may be implemented to solve for the set of feasible paths that maximizes the sum of scores across all pairings; mathematical solver may implemented on computing device 104 and/or another device in system 100, and/or may be implemented on third-party solver.

Continuing in reference to FIG. 1, objective function may be implemented as described above, and/or as described in U.S. Nonprovisional application Ser. No. 16/890,839, filed on Jun. 2, 2020, and entitled "METHODS AND SYSTEMS FOR PATH SELECTION USING VEHICLE ROUTE GUIDANCE," the entirety of which is incorporated herein by reference. A machine-learning process, such as a cluster machine-learning process 124 may call such an algorithm and perform it for one or more steps in generating a physical transfer pattern 128 and/or optimizing the physical transfer pattern 128, given a plurality of constraints 132. Persons skilled in the art, upon review of this disclosure in its entirety, will be aware of the various methods and algorithms performed by a computing device to optimize a physical transfer patterns given a plurality of variables that represent constraints to the optimal solution.

Continuing in reference to FIG. 1, computing device 104 minimizing the objective function may include minimizing plurality of physical transfer resources further comprises minimizing the number of physical transfer apparatuses utilized while minimizing the amount of time to perform the physical transfer pattern. Cluster machine-learning process 124 may perform an objective function, as described above, to optimize a plurality of physical transfer patterns 128, wherein optimizing the plurality of physical transfer patterns 128 may include working toward an output that represents a single physical transfer pattern 128 of the plurality that minimizes the use of resources, including the number of amount of physical transfer apparatuses 112 used and/or the amount of time needed to complete each physical transfer pattern 128.

Continuing in reference to FIG. 1, using an objective function to minimize physical transfer resources may include optimizing a plurality of variables involved in determining a physical transfer pattern 128. Optimizing may include, for instance, minimizing the number of physical transfer apparatuses used while minimizing the amount of time to complete a physical transfer pattern 128. Variables may include, the number of, availability of, and geophysical location of physical transfer apparatuses 112, the order of receiving alimentary elements from originators, the time of originators generating each alimentary element, the transfer paths each physical transfer apparatus 112 follows, and the like. Computing device 104 performing cluster machine-learning process 124 may use an objective function, as described above, wherein an optimal solution results in reducing the number of physical transfer apparatuses used to complete a physical transfer pattern 128. Alternatively or additionally, cluster machine-learning process 124 may use an objective function to determine the values of variables associated with, for instance and without limitation, the times for preparing the alimentary elements, the order in which the alimentary elements are obtained, and the transfer paths taken, wherein the objective function determines when alimentary elements are to be generated in order to minimize the time required for a physical transfer apparatus 112 to follow the transfer paths in obtaining them all.

In some instances, and still referring to FIG. 1, reducing the number of physical transfer apparatuses 112 may result in a concomitant increase in the amount of time required to complete the physical transfer pattern 128. In such an instance, cluster machine-learning process 124 may recognize that such a tradeoff exists, wherein decreasing one parameter (number of physical transfer apparatuses 112) increases a second parameter (time required for completing transfer paths). In such an example, cluster machine-learning process 124 may determine from an identifier a maximal threshold of time exists, wherein the maximal threshold of time for a cluster 108 of alimentary elements must not be exceeded for physical transfer. For instance and without limitation, upon placing the cluster 108 of a plurality of alimentary elements, a plurality of users may receive an estimated timestamp describing when to expect the alimentary elements. In such an example, this estimated timestamp may be included in the identifier associated with alimentary element, wherein the timestamp becomes a constraint that the cluster machine-learning process 124 'knows' the optimized physical transfer pattern 128 must not exceed. In such a non-limiting example, cluster machine-learning process 124 may then learn to minimize physical transfer apparatus resources, including vehicles, transfer paths, personnel, and the like, while keeping below a maximal time threshold in an identifier. If not possible with the current number of physical transfer apparatuses selected, cluster machine-learning process 124 'knows' to increase by a discrete amount, such as by 1 physical transfer apparatus, and re-calculate time requirements for completing physical transfer paths. Cluster machine-learning process 124 may iteratively perform these optimization calculations, wherein the cluster machine-learning process 124 may 'learn' for each cluster 108 the number of physical transfer apparatuses result in minimized time requirements, wherein the maximal time requirement may be used to minimize the number of physical transfer apparatuses used.

Continuing in reference to FIG. 1, cluster machine-learning process 124 may use an optimized physical transfer pattern 128, wherein the number of physical transfer apparatuses 112 and time requirements are minimized, to inform when each alimentary element originator should prepare and/or generate each alimentary element. Cluster machine-learning process 124 may identify an optimal transfer path from each alimentary element to the final location for the optimized number of physical transfer apparatuses 112, wherein the transfer path dictates the order in which each alimentary elements are picked-up, and thus when the alimentary element should be prepared and/or generated by the originator. Alternatively or additionally, cluster machine-learning process 128 may determine which a transfer path between each originator and determine the order in which originators should prepare and/or generate each alimentary element for the physical transfer apparatus to follow the optimal physical transfer pattern 128.

Continuing in reference to FIG. 1, determining a physical transfer pattern 128 may include using a cluster machine-learning process 124 to generate a plurality of candidate transfer paths 140, wherein each candidate physical transfer path 140 is a geophysical path that a physical transfer apparatus 112 may follow to obtain an alimentary element and transfer to a single locale. A "geophysical path," as used in this disclosure, is a set of data which traces a path throughout a physical space along which a physical transfer apparatus may travel. A set of data included in a geophysical path may include, in non-limiting examples, a series of addresses, longitude and/or latitude data, and global position system (GPS) coordinates. A physical space along which a physical transfer apparatus may travel may include a neighborhood, city, building, and the like. Cluster machine-learning process 124 may output, as a function of optimizing a physical transfer pattern 128, a plurality of candidate transfer paths 140, wherein each output is a geophysical path that a physical transfer apparatus 112, and/or a plurality of physical transfer apparatuses may follow in concert to obtain all alimentary elements and transfer to the single locale within a specific time frame.

Continuing in reference to FIG. 1, determining a physical transfer pattern 128 may include using the cluster machine-learning process 124 to identify at least an interchange node, wherein each interchange node of the at least an interchange node comprises a node location and a node time based on the physical locations of a plurality of physical transfer apparatuses prior to physical transfer to a user location. An "interchange node," as used in this disclosure, is a centralized geophysical location that can become a distribution center for alimentary elements to be loaded, swapped, or otherwise exchanged between physical transfer apparatuses, including a time associated with when physical transfer apparatuses are to arrive at the geophysical location. For instance and without limitation, interchange nodes 144 may be parking lots, fuel stations, warehouses, storage centers, parks, convenience stores, or the like, that may accommodate physical transfer apparatuses to take on alimentary elements for physical transfer. An interchange node 144 location and time for physical transfer to meet at a node location may be generated and/or selected by computing device 104 based on candidate physical transfer path, physical transfer apparatus geophysical location, transfer time-stamps, and the like, as described above by cluster machine-learning process 128 and/or as described in U.S. Nonprovisional application Ser. No. 16/983,096, filed on Aug. 3, 2020, and entitled "METHODS AND SYSTEMS FOR DETERMINING PHYSICAL TRANSFER INTER-CHANGE NODES," the entirety of which is incorporated herein by reference.

Continuing in reference to FIG. 1, determining a physical transfer pattern 128 may include calculating a change in candidate physical transfer path 140 time and distance resulting from using the interchange node 144. Computing device 104 may generate interchange node locations, as described above, wherein the cluster machine-learning process 124 may accept the interchange node as an input for outputting candidate physical transfer paths 140. Cluster machine-learning process 124 may include an interchange node 144 in candidate physical transfer paths 140 and calculate, using any mathematical operation, such as subtraction, if adding the interchange node 144 resulted in minimizing the number of physical transfer apparatuses 112 and/or minimizing the time required for the physical transfer. Alternatively or additionally, computing device 104 may calculate difference between candidate physical transfer path 140 times and distances outputs, with and without an interchange node 144 included, and iteratively determine if including the interchange node minimizes physical resources. In the event that adding the interchange node 144 results in a more optimal physical transfer pattern 128, cluster machine-learning process 124 may generate more candidate transfer paths 140 with additional interchange nodes 144. The addition of interchange nodes 144 may be done until the amount of physical resources are exceeded (not enough physical transfer apparatuses available), and/or the time is no longer being minimized with adding interchange nodes 144.

Continuing in reference to FIG. 1, determining a physical transfer pattern may include which physical transfer path and interchange node 144 pairing of the plurality of candidate transfer paths 140 minimizes the objective function. Computing device 104 may select the physical transfer path of the plurality of candidate physical transfer paths 140 and interchange node 144 pairing that results in minimizing the physical resources used, as described above. Computing device 104 may determine a physical transfer pattern 128 which includes a plurality of candidate physical transfer paths 140 and at least an interchange node 144, wherein pairing each physical transfer path and interchange node 144 represents an optimal physical transfer.

Continuing in reference to FIG. 1, computing device 104 is configured to select a physical transfer path that minimizes the objective function. In non-limiting illustrative examples, computing device 104 may use a ranking machine-learning process 148, wherein a ranking machine-learning process 148 may be any machine-learning process and/or algorithm used for classification as described in further detail below, wherein classification may be performed as a ranking of inputs to generate outputs classified into a ranked list, provided a criterion for ranking. In non-limiting illustrative examples, the ranking may be a limitation logistic regression and/or naive Bayes ranking algorithm, nearest neighbor algorithm such as k-nearest neighbors, support vector machines, least squares support vector machines, fisher's linear discriminant, quadratic classifiers, decision trees, boosted trees, random forest classifiers, learning vector quantization, and/or neural network-based algorithms, as described herein. Ranking machine-learning process 148 may accept an input that is a plurality of candidate transfer paths 140, a plurality of physical transfer patterns 128, and/or any other determination of a system 100 as described herein, and generate an output that is a ranked list of outputs according to a ranking criteria. For instance and without limitation, a ranking criterion may be that the highest ranking is reserved for the outcome that results in minimal time for a physical transfer, or the least amount of physical transfer apparatuses 112 required. A ranking process may include any of the functions described above, such as an objective function that may input a plurality of objectives, such as a plurality of constraints, and rank the objectives by a variety of factors, for instance without limitation, by number of physical transfer apparatuses used, time required for physical transfer path, and the like, and output a first rank-ordered goal set 124 ranked by that function. Computing device 104 may perform a ranking algorithm using a machine-learning process, as described in further detail below. Computing device 104 may perform a ranking function using any process, method, and/or algorithm as described herein wherein ranking is based on physical transfer recourses and physical transfer time. In non-limiting illustrative examples, computing device 104 may include interchange node 144 for a cluster machine-learning process 128 depending on if the ranking determines that adding an interchange node 144 results in higher ranked candidate physical transfer paths 140 and/or higher ranked physical transfer patterns 128.

Continuing in reference to FIG. 1, determining which physical transfer path and/or interchange node 144 pairing represents an optimal physical transfer path may include selecting the optimal physical transfer path which minimizes physical transfer resources and physical transfer time as a function of the ranking. Computing device 104 may select the candidate physical transfer path 140 and interchange node pairing that results in the optimal physical transfer path, wherein the optimal physical transfer path minimizes physical transfer resources and physical transfer time according to the ranking. In non-limiting illustrative examples, the candidate physical transfer path 140 and interchange node pairing may include no interchange node 144. In further non-limiting illustrative examples, computing device 104 may select the optimal candidate physical transfer path 140, wherein each candidate transfer path 140 is for a single alimentary element and/or alimentary element originator. In such an instance, computing device 104 may generate the optimal physical transfer pattern 128 by selecting the optimal candidate physical transfer path 140 for each individual alimentary element. Alternatively or additionally, computing device 104 may generate the optimal physical transfer pattern 128 by selecting the optimal candidate physical transfer path 140 for each cluster combination, wherein the candidate physical transfer path 140 is a physical transfer path for all alimentary elements. Furthermore, without limitation, the optimal candidate physical transfer path 140 nay include one or more interchange nodes 144 paired with the physical transfer path.

Still referring to FIG. 1, computing device 104 may be configured to determine a cluster instruction set for physical transfer pattern 128 to a single destination. A "cluster instruction set," as used in this disclosure, is a series of steps, instructions, or both associated with carrying out the physical transfer pattern. A cluster instruction set may include physical transfer paths for at least a physical transfer apparatus to follow, geolocation and times associated with any interchange nodes, timestamps for alimentary element originators to generate alimentary elements, and a single destination for a cluster. A cluster instruction set 172 may be generated for the optimal physical transfer pattern, as selected by the computing device 104.

Continuing in reference to FIG. 1, determining a cluster instruction set 172 for a selected physical transfer pattern 128 to a single locale may include generating preparation instructions as a function of the selected physical transfer pattern and may include transmitting the preparation instructions to at least an alimentary element originator. Preparation instructions may include instructions directed to alimentary element originators based on when to prepare and/or generate each alimentary element and to which physical transfer apparatus 112 each alimentary element belongs. Computing device 104 may determine which instructions contain information that corresponds to responsibilities delegated to alimentary element originators, including when to prepare and/or generate alimentary elements, the identity of the physical transfer apparatus destined to receive the alimentary element and when the physical transfer to the physical transfer apparatus is to occur. Computing device 104 may generate a representation of the cluster instruction set 172 as it pertains to the alimentary element originator, as described in further detail below. Computing device 104 may transmit the preparation instructions to at least an alimentary element origination via a graphical user interface, as described in further detail below.

Continuing in reference to FIG. 1, computing device 104 may generate a physical transfer instruction set 164. For example, determining a cluster instruction set 172 for a selected physical transfer pattern 128 to a single locale may include generating physical transfer instructions as a function of the selection physical transfer pattern and may include transmitting the physical transfer instructions to at least a physical transfer apparatus. Physical transfer instructions may include instructions directed to at least a physical transfer apparatus 112 based on where to receive each alimentary element and the geophysical path associated with the optimal physical transfer pattern 128 and the location and time for any interchange nodes 144. Computing device 104 may determine which instructions contain information that corresponds to responsibilities delegated physical transfer apparatuses 112, including where to receive the alimentary elements from originators, the identity of the alimentary element, the physical transfer path to the alimentary element, the location and times associated with any interchange nodes 144, the physical transfer path to any interchange nodes 144, the physical transfer path to the single locale, and/or the identity to any of the plurality of users to which the cluster combination of alimentary elements belongs. Computing device 104 may generate a representation of the cluster instruction set 172 as it pertains to the physical transfer apparatuses, as described in further detail below. Cluster instruction set 172 may include instructions regarding where to receive each alimentary element and the geophysical path associated with the optimal physical transfer pattern 128 and the location and time for any interchange nodes 144. Computing device 104 may transmit the physical transfer instructions to at least a physical transfer apparatus via a graphical user interface, as described in further detail below.

Continuing in reference to FIG. 1, computing device 104 may generate a representation of cluster instruction set 172 via a graphical user interface. Computing device 104 may transmit to at least a physical transfer apparatus 112 cluster instruction set 172, a representation of cluster instruction set 172, and/or physical transfer instruction set 164. In some embodiments, computing device 104 may transmit to a plurality of alimentary element originators at least a physical transfer apparatus 112 cluster instruction set 172, a representation of cluster instruction set 172, and/or physical transfer instruction set 164. Computing device 104 may generate a representation of the cluster instruction set 172 via a graphical user interface that includes graphics, text, and/or any other audiovisual display and/or transmittance. A "graphical user interface," as used in this disclosure, is any form of a user interface that allows a user to interface with an electronic device through graphical icons, audio indicators, text-based interface, typed command labels, text navigation, and the like, wherein the interface is configured to provide information to the user and accept input from the user. Computing device 104 may generate a representation of the cluster instruction set 172 via a graphical user interface using any mapping application or algorithm, for instance and without limitation, a web-based navigation application such, a mobile navigation application, or the like. Persons skilled in the art, upon review of this disclosure in its entirety, will be aware of the various ways in which a computing device 104 may display to a user a physical transfer path via a graphical user interface, and be aware the various navigation applications that may be used to communicate a physical transfer path.

Still referring to FIG. 1, in some embodiments, computing device 104 may receive feedback from a user. Feedback may relate to, for example, a delivery process and/or an effectiveness of a delivery driver. In some embodiments, such feedback may be used to determine suggested and/or default preferences for the user and/or similar users. In a non-limiting example, if a user consistently submits feedback indicating poor satisfaction with respect to group alimentary item orders, then computing device 104 may promote individual orders to the user.

Still referring to FIG. 1, in some embodiments, a system may include a chat platform. A chat platform may associate a first user who has ordered an alimentary item with a second user who is to deliver the alimentary item to the first user. A communication channel between such first user and second user may be opened. Such a communication channel may be closed upon delivery. A communication channel may include more than two parties. For example, if a first user is to deliver alimentary items to a plurality of other users at a particular location, then each of these users may share a chat platform channel. A chat platform may connect users via text communication, audio communication, video communication, and the like. A chat platform may be used to, for example, provide a user delivering an alimentary item with additional instructions, such as specifically where to deliver to or how to get to the correct location.

Still referring to FIG. 1, in some embodiments, computing device 104 may identify leftover food from an entity producing alimentary items, such as a restaurant. Leftover food may include, for example, food prepared for a given day but not used. Computing device 104 may identify leftover food based on, for example, communication from the entity producing alimentary items. For example, computing device

104 may transmit a signal to a device operated by an entity producing alimentary items configuring the device to display a message asking for a list of leftover food towards the end of the hours of operation of the entity. If computing device 104 receives a communication from the entity indicating that there is leftover food, then computing device 104 may promote the leftover food and/or discount environmental impact estimate 152 normally applied to such alimentary item.

Still referring to FIG. 1, in some embodiments, one or more steps described herein may be performed using generative machine learning. Machine learning is described in FIGS. 4-6. For example, computing device 104 may input a datum into a generative machine learning model, may receive an output, and may use the output in a further step. In a non-limiting example, computing device 104 may input into a generative machine learning model a question asking what the environmental impact of a particular alimentary item delivery is, may receive a response as an output, and may interpret the response in order to identify an environmental impact. Computing device may use a language model to interpret a response. In another non-limiting example, computing device 104 may input into a generative machine learning model a question asking which of two delivery modes has higher environmental impact, may receive a response, and may recommend a delivery mode as a function of the response. In another non-limiting example, computing device 104 may communicate with a user through a chatbot. Chatbots are described in FIG. 9. Such a chatbot may be used to, for example, answer user questions about environmental impact. Generative machine learning may be used to produce chatbot responses.

With continued reference to FIG. 1, in one or more embodiments, computing device 104 may implement one or more aspects of "generative artificial intelligence (AI)," a type of AI that uses machine learning algorithms to create, establish, or otherwise generate data such as, without limitation, environmental impact estimate 152 and/or the like in any data structure as described herein (e.g., text, image, video, audio, among others) that is similar to one or more provided training examples. In an embodiment, machine learning module described herein may generate one or more generative machine learning models that are trained on one or more set of training data. One or more generative machine learning models may be configured to generate new examples that are similar to the training data of the one or more generative machine learning models but are not exact replicas; for instance, and without limitation, data quality or attributes of the generated examples may bear a resemblance to the training data provided to one or more generative machine learning models, wherein the resemblance may pertain to underlying patterns, features, or structures found within the provided training data.

Still referring to FIG. 1, in some cases, generative machine learning models may include one or more generative models. As described herein, "generative models" refers to statistical models of the joint probability distribution $P(X,Y)$ on a given observable variable x, representing features or data that can be directly measured or observed (e.g., questions asking about environmental impacts of certain categories of alimentary item) and target variable y, representing the outcomes or labels that one or more generative models aims to predict or generate (e.g., environmental impact estimate 152). In some cases, generative models may rely on Bayes theorem to find joint probability; for instance, and without limitation, Naïve Bayes classifiers may be employed by computing device to categorize input data such as, without limitation, alimentary items into different categories such as, without limitation, burgers, salads, and soft drinks.

In a non-limiting example, and still referring to FIG. 1, one or more generative machine learning models may include one or more Naïve Bayes classifiers generated, by computing device, using a Naïve bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) \ P(A) \div P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing Device may then calculate a likelihood table by calculating probabilities of different data entries and classification labels. Computing device may utilize a naïve Bayes equation to calculate a posterior probability for each class. A class containing the highest posterior probability is the outcome of prediction.

Still referring to FIG. 1, although Naïve Bayes classifier may be primarily known as a probabilistic classification algorithm; however, it may also be considered a generative model described herein due to its capability of modeling the joint probability distribution P(X,Y) over observable variables X and target variable Y. In an embodiment, Naïve Bayes classifier may be configured to make an assumption that the features X are conditionally independent given class label Y, allowing generative model to estimate the joint distribution as $P(X,Y)=P(Y)\Pi_i P(X_i|Y)$, wherein P(Y) may be the prior probability of the class, and $P(X_i|Y)$ is the conditional probability of each feature given the class. One or more generative machine learning models containing Naïve Bayes classifiers may be trained on labeled training data, estimating conditional probabilities $P(X_i|Y)$ and prior probabilities P(Y) for each class; for instance, and without limitation, using techniques such as Maximum Likelihood Estimation (MLE). One or more generative machine learning models containing Naïve Bayes classifiers may select a class label y according to prior distribution P(Y), and for each feature $X_i$, sample at least a value according to conditional distribution $P(X_i|y)$. Sampled feature values may then be combined to form one or more new data instance with selected class label y. In a non-limiting example, one or more generative machine learning models may include one or more Naïve Bayes classifiers to generate new examples of alimentary item categorization based on a name of the specific alimentary item being categorized (e.g., burger, salad), wherein the models may be trained using training data containing a plurality of features e.g., a name or description, and/or the like as input correlated to a plurality of labeled classes as output.

Still referring to FIG. 1, in some cases, one or more generative machine learning models may include generative adversarial network (GAN). As used in this disclosure, a "generative adversarial network" is a type of artificial neural network with at least two sub models (e.g., neural networks), a generator, and a discriminator, that compete against each other in a process that ultimately results in the generator learning to generate new data samples, wherein the "generator" is a component of the GAN that learns to create hypothetical data by incorporating feedbacks from the "discriminator" configured to distinguish real data from the hypothetical data. In some cases, generator may learn to make discriminator classify its output as real. In an embodiment, discriminator may include a supervised machine learning model while generator may include an unsupervised machine learning model as described in further detail with reference to FIG. 4.

With continued reference to FIG. 1, in an embodiment, discriminator may include one or more discriminative models, i.e., models of conditional probability P(Y|X=x) of target variable Y, given observed variable X. In an embodiment, discriminative models may learn boundaries between classes or labels in given training data. In a non-limiting example, discriminator may include one or more classifiers as described in further detail below with reference to FIG. 4 to distinguish between different categories e.g., correct vs incorrect, or states e.g., TRUE vs. FALSE within the context of generated data such as, without limitations, whether an alimentary item is part of a category, and/or the like. In some cases, computing device may implement one or more classification algorithms such as, without limitation, Support Vector Machines (SVM), Logistic Regression, Decision Trees, and/or the like to define decision boundaries.

In a non-limiting example, and still referring to FIG. 1, generator of GAN may be responsible for creating synthetic data that resembles real output data. In some cases, GAN may be configured to receive input data, as input and generates corresponding output data containing information describing or evaluating the performance of one or more elements of input data. On the other hand, discriminator of GAN may evaluate the authenticity of the generated content by comparing it to real output data, for example, discriminator may distinguish between genuine and generated content and providing feedback to generator to improve the model performance.

With continued reference to FIG. 1, in other embodiments, one or more generative models may also include a variational autoencoder (VAE). As used in this disclosure, a "variational autoencoder" is an autoencoder (i.e., an artificial neural network architecture) whose encoding distribution is regularized during the model training process in order to ensure that its latent space includes desired properties allowing new data sample generation. In an embodiment, VAE may include a prior and noise distribution respectively, trained using expectation-maximization meta-algorithms such as, without limitation, probabilistic PCA, sparse coding, among others. In a non-limiting example, VEA may use a neural network as an amortized approach to jointly optimize across input data and output a plurality of parameters for corresponding variational distribution as it maps from a known input space to a low-dimensional latent space. Additionally, or alternatively, VAE may include a second neural network, for example, and without limitation, a decoder, wherein the "decoder" is configured to map from the latent space to the input space.

In a non-limiting example, and still referring to FIG. 1, VAE may be used by computing device to model complex relationships between elements of input data. In some cases, VAE may encode input data into a latent space, capturing output data. Such encoding process may include learning one or more probabilistic mappings from observed input data to a lower-dimensional latent representation. Latent representation may then be decoded back into the original data space, therefore reconstructing the output data. In some cases, such decoding process may allow VAE to generate new examples or variations that are consistent with the learned distributions.

Still referring to FIG. 1, computing device may configure generative machine learning models to analyze input data such as, without limitation, questions about environmental impact of certain ingredients to one or more predefined templates such as templates representing correct environmental impacts described above, thereby allowing computing device to identify discrepancies or deviations from correct environmental impacts. In some cases, computing device may be configured to pinpoint specific errors in input data. In some cases, errors may be classified into different categories or severity levels. In a non-limiting example, some errors may be considered minor, and generative machine learning model such as, without limitation, GAN may be configured to generate outputs which contain only slight adjustments while others may be more significant and demand more substantial corrections. In some embodiments, computing device may be configured to flag or highlight errors in input data altering the data source, directly on the input data using one or more generative machine learning models described herein. In some cases, one or more generative machine learning models may be configured to generate and output indicators such as, without limitation, visual indicator, audio indicator, and/or any other indicators as described above. Such indicators may be used to signal the detected error described herein.

Still referring to FIG. 1, in some cases, computing device may be configured to identify and rank detected common deficiencies such as inconsistent units across plurality of data sources; for instance, and without limitation, one or more machine learning models may classify errors in a specific order e.g., incorrect units used and lack of specificity in the category of alimentary item being measured in a descending order of commonality. Such ranking process may enable a prioritization of most prevalent issues, allowing instructors or computing device to address the issues.

Additionally, or alternatively, and still referring to FIG. 1, computing device may be configured to continuously monitor input data. In an embodiment, computing device may configure discriminator to provide ongoing feedback and further corrections as needed to subsequent input data. An iterative feedback loop may be created as computing device continuously receive real-time data, identify errors as a function of real-time data, delivering corrections based on the identified errors, and monitoring signals on the delivered corrections. In an embodiment, computing device may be configured to retrain one or more generative machine learning models or update training data of one or more generative machine learning models by integrating a response into the original training data. In such embodiment, iterative feedback loop may allow machine learning module to adapt to the response, enabling one or more generative machine learning models described herein to learn and update based on the response and generated feedback.

With continued reference to FIG. 1, other exemplary embodiments of generative machine learning models may include, without limitation, long short-term memory networks (LSTMs), (generative pre-trained) transformer (GPT) models, mixture density networks (MDN), and/or the like.

Still referring to FIG. 1, in a further non-limiting embodiment, machine learning module may be further configured to generate a multi-model neural network that combines various neural network architectures described herein. In a non-limiting example, multi-model neural network may combine LSTM for time-series analysis with GPT models for natural language processing. In some cases, multi-model neural network may also include a hierarchical multi-model neural network, wherein the hierarchical multi-model neural network may involve a plurality of layers of integration; for instance, and without limitation, different models may be combined at various stages of the network. Convolutional neural network (CNN) may be used for image feature extraction, followed by LSTMs for sequential pattern recognition, and a MDN at the end for probabilistic modeling. Other exemplary embodiments of multi-model neural network may include, without limitation, ensemble-based multi-model neural network, cross-modal fusion, adaptive multi-model network, among others. As an ordinary person skilled in the art, upon reviewing the entirety of this disclosure, will be aware of various generative machine learning models may be used to perform a step described herein. As an ordinary person skilled in the art, upon reviewing the entirety of this disclosure, will be aware of various multi-model neural network and combination thereof that may be implemented by computing device 104 consistent with this disclosure.

Referring now to FIGS. 2A and 2B, a non-limiting exemplary embodiment 200 of a user device 204 for providing a cluster instruction set 172 is illustrated. Computing device 104 may generate, for instance and without limitation, at least two different representation of a cluster instruction set 172, wherein one representation is configured for an alimentary element originator (as depicted in FIG. 2A) and one representation is configured for a physical transfer apparatus (as depicted in FIG. 2B). Computing device 104 may display cluster instruction set 172 instruction via a user device 204, wherein a user device is any device that may be a computing device 104, such as a "smartphone", laptop, tablet, or any other device with capabilities as described herein. In non-limiting exemplary embodiments, user device 204 may display the generated representation via a graphical user interface (GUI), wherein the GUI represents, as is the case in FIG. 2A, which alimentary element relates to which user, when to generate and/or prepare each alimentary element, the identity of the physical transfer apparatus to obtain the items, the payment status of the alimentary element, and the rank with which to prepare items according to the timing of the physical transfer paths associated with a plurality of cluster combinations 108. In non-limiting exemplary embodiments, user device 204 may display the generated representation via a graphical user interface (GUI), wherein the GUI represents, as is the case in FIG. 2B, the identity and location of the alimentary element originator, the order in which the alimentary elements of the cluster 108 are to be received, and the physical transfer pattern 128 associated with the physical transfer apparatus 112.

Figure 3:
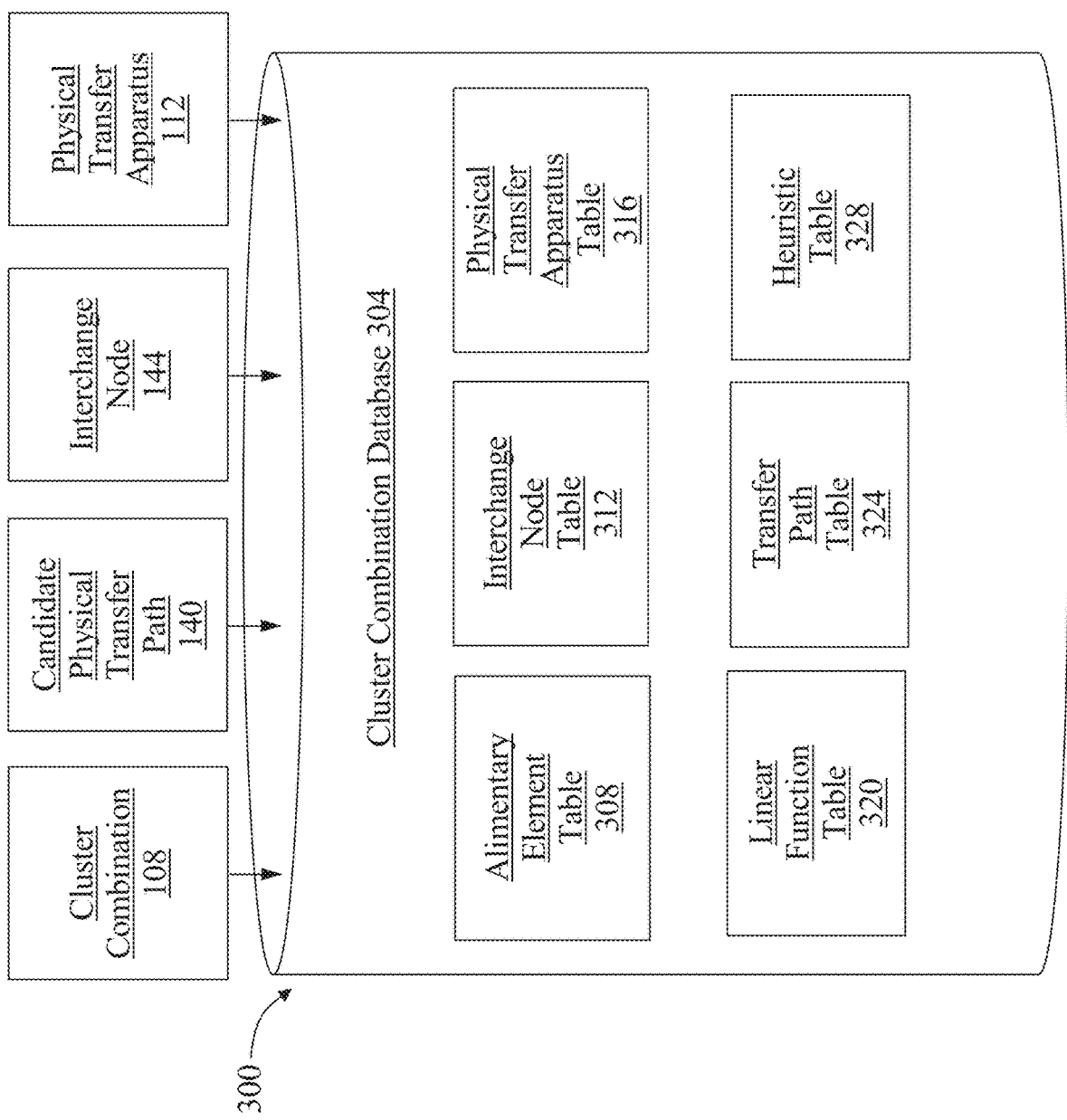
FIG. 3 is a block diagram of an exemplary embodiment of a cluster database.

Referring now to FIG. 3, a non-limiting exemplary embodiment 300 of a cluster combination database 304 is illustrated. Cluster combination database 304 may be implemented, without limitation, as a relational database, a key-value retrieval database such as a NOSQL database, or any other format or structure for use as a database that a person skilled in the art would recognize as suitable upon review of the entirety of this disclosure. Cluster combination database 304 may alternatively or additionally be implemented using a distributed data storage protocol and/or data structure, such as a distributed hash table and the like. Cluster combination database 304 may include a plurality of data entries and/or records, as described above. Data entries in a cluster combination database 304 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Further referring to FIG. 3, cluster combination database 304 may include, without limitation, an alimentary element table 308, interchange node table 312, physical apparatus table 316, objective function table 320, transfer path table 324, and/or heuristic table 328. Determinations by a machine-learning process, machine-learning model, ranking function, mapping algorithm, and/or objective function may also be stored and/or retrieved from the cluster combination database 304, for instance in non-limiting examples a classifier describing a plurality of candidate transfer paths 140 as it relates to a selected interchange node 144, wherein a classifier is an identifier that denotes a subset of data that contains a heuristic and/or relationship, as may be useful to system 100 described herein. Determinations by a machine-learning process for selecting a region for determining a physical transfer pattern 128 and/or a rankings of candidate physical transfer paths 140 based on physical transfer apparatus availability, geolocation, timing, and the like, may also be stored and/or retrieved from the cluster combination database 304. As a non-limiting example, cluster combination database 304 may organize data according to one or more instruction tables. One or more cluster combination database 304 tables may be linked to one another by, for instance in a non-limiting example, common column values. For instance, a common column between two tables of cluster combination database 304 may include an identifier of a submission, such as a form entry, textual submission, global position system (GPS) coordinates, addresses, and the like, for instance as defined herein; as a result, a query by a computing device 104 may be able to retrieve all rows from any table pertaining to a given submission or set thereof. Other columns may include any other category usable for organization or subdivision of data, including types of data, names and/or identifiers of individuals submitting the data, times of submission, and the like; persons skilled in the art, upon reviewing the entirety of this disclosure, will be aware of various ways in which data from one or more tables may be linked and/or related to data in one or more other tables.

Still referring to FIG. 3, in a non-limiting embodiment, one or more tables of a cluster combination database 304 may include, as a non-limiting example, an alimentary element table 308, which may include geolocations, GPS coordinates, addresses, or the like, associated with the location of a plurality of users corresponding to a cluster 108, the identity of the alimentary elements in said cluster 108, and/or linked to other data such as the order destination geolocation data for the cluster combination, the alimentary element identifiers 136, and/or other elements of data computing device 104 and/or system 100 may store, retrieve, and use to determine usefulness and/or relevance of data in determining physical transfer patterns 128, assigning physical transfer apparatuses 112, and the like, as described in this disclosure. One or more tables may include interchange node table 312, which may include a history of numerical values, GPS coordinates, addresses, timestamps, and the like, for instance and without limitation, that represent interchange nodes 144 determined for physical transfer apparatuses in determining location and time for interchange nodes 144 that may have worked in the past. One or more tables may include a physical transfer apparatus table 316, which may store and/or organize the number and identity of physical transfer apparatuses 112, their availability, geolocation, and the like. One or more tables may include an objective function table 320, which may store and/or organize which may store and/or organize rankings, scores, models, outcomes, functions, numerical values, vectors, matrices, and the like, that represent determinations, optimizations, iterations, variables, and the like used in optimizing an objective function, as described herein, including data corresponding to a plurality of constraints associated with optimizing the objective function for determining a physical transfer pattern 128. One of more tables may include a transfer path table 324, which may include geolocations, GPS coordinates, addresses, or the like, associated with one or more candidate physical transfer paths 140, the success rate of using a physical transfer path, and other confounding variables associated with following a physical transfer path including traffic patterns, roadwork, obstacles, and the like. One or more tables may include, without limitation, a heuristic table 328, which may include one or more inputs describing potential mathematical relationships between at least an element of user data and, for instance and without limitation, batching instructions, and rankings thereof, and/or predicted paths and how they may change as a function of reaching particle areas of a map, as described in further detail below.

Figure 4:
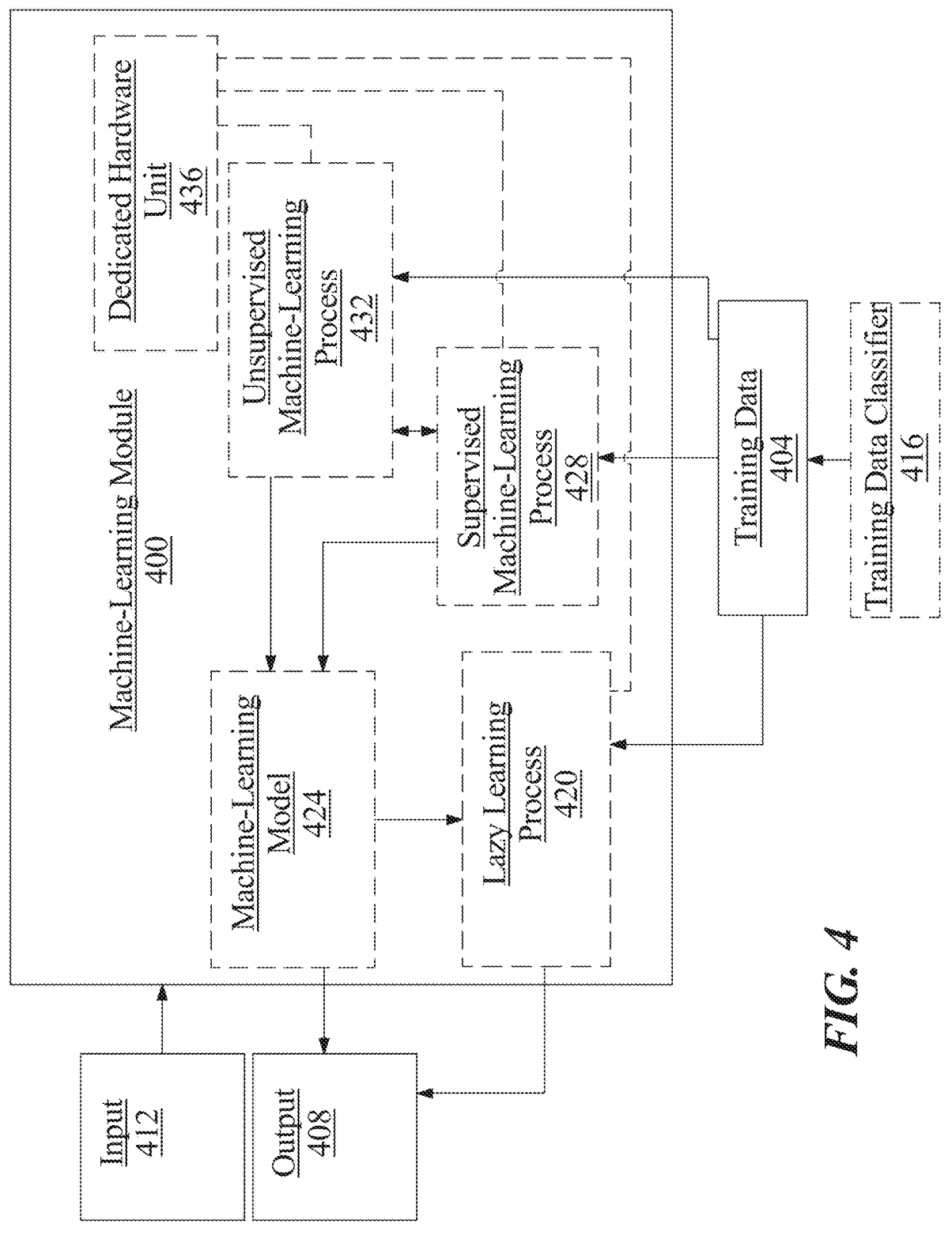
FIG. 4 is a block diagram of an exemplary embodiment of a machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, inputs may include an alimentary element, and an output may include an alimentary item category.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to specific categories of alimentary item such as fast food.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include alimentary item names as described above as inputs, categorizations as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

With continued reference to FIG. 4, apparatus 100 may use user feedback to train the machine-learning models and/or classifiers described above. For example, classifier may be trained using past inputs and outputs of classifier. In some embodiments, if user feedback indicates that an output of classifier was "bad," then that output and the corresponding input may be removed from training data used to train classifier, and/or may be replaced with a value entered by, e.g., another user that represents an ideal output given the input the classifier originally received, permitting use in retraining, and adding to training data; in either case, classifier may be retrained with modified training data as described in further detail below. In some embodiments, training data of classifier may include user feedback.

With continued reference to FIG. 4, in some embodiments, an accuracy score may be calculated for classifier using user feedback. For the purposes of this disclosure, "accuracy score," is a numerical value concerning the accuracy of a machine-learning model. For example, a plurality of user feedback scores may be averaged to determine an accuracy score. In some embodiments, a cohort accuracy score may be determined for particular cohorts of persons. For example, user feedback for users belonging to a particular cohort of persons may be averaged together to determine the cohort accuracy score for that particular cohort of persons and used as described above. Accuracy score or another score as described above may indicate a degree of retraining needed for a machine-learning model such as a classifier; apparatus 100 may perform a larger number of retraining cycles for a higher number (or lower number, depending on a numerical interpretation used), and/or may collect more training data for such retraining, perform more training cycles, apply a more stringent convergence test such as a test requiring a lower mean squared error, and/or indicate to a user and/or operator that additional training data is needed.

Figure 5:
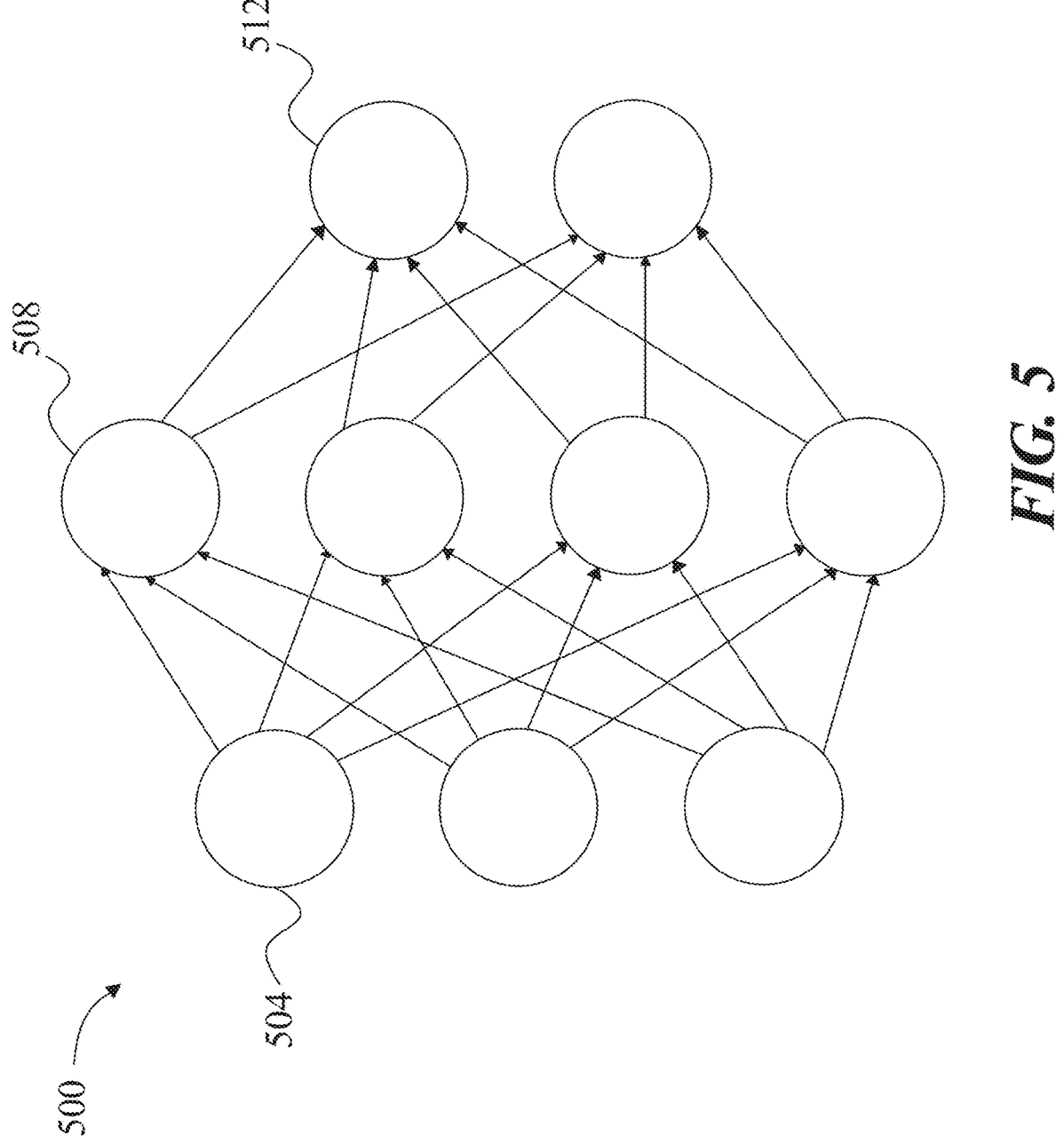
FIG. 5 is a diagram of an exemplary neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
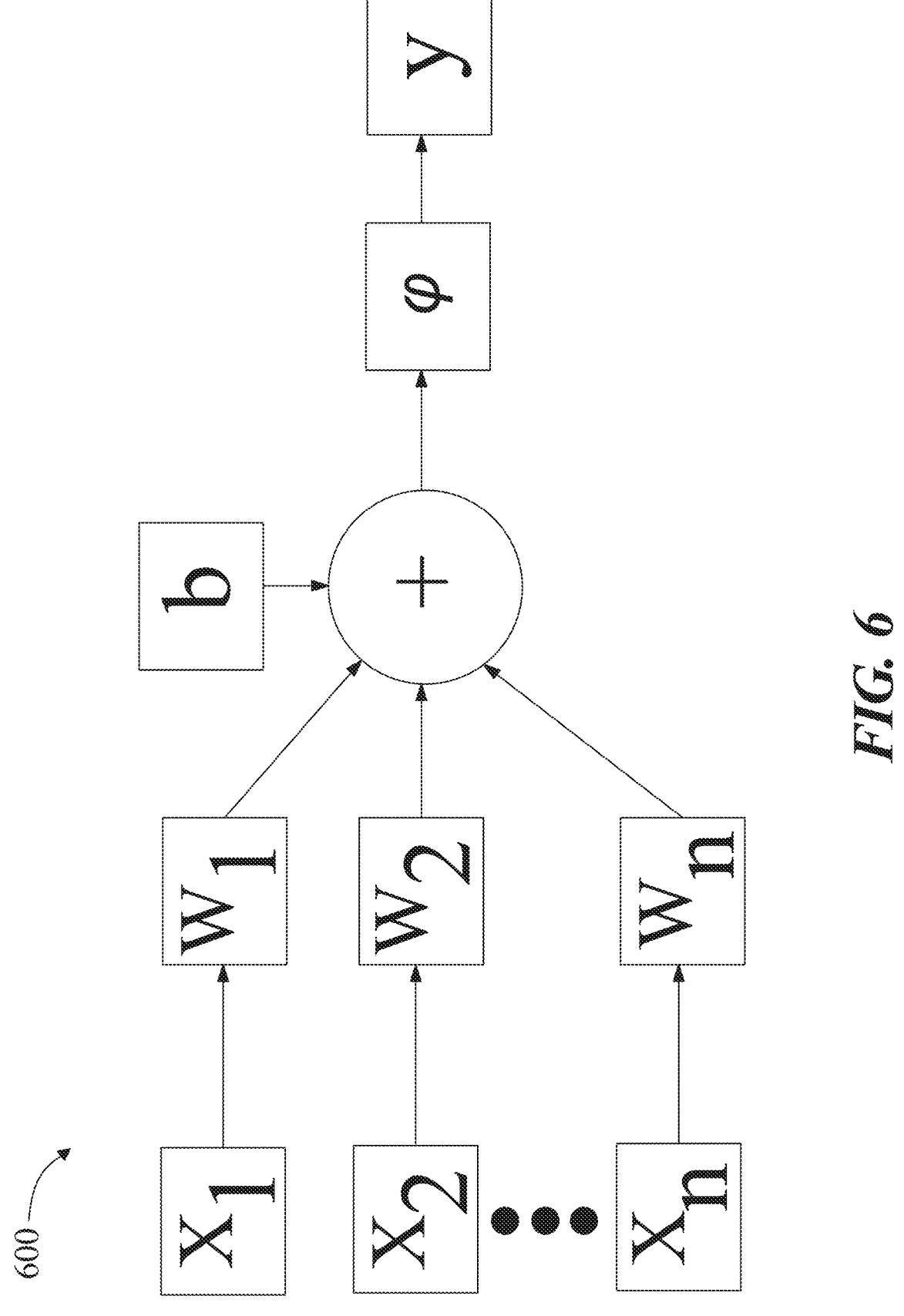
FIG. 6 is a diagram of an exemplary neural network node.

Referring now to FIG. 6, an exemplary embodiment of a node 600 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x) = \tanh^2(x)$, a rectified linear unit function such as $f(x) = \max(0, x)$, a "leaky" and/or "parametric" rectified linear unit function such as $f(x) = \max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x) = x * \text{sigmoid}(x)$, a Gaussian error linear unit function such as $f(x) = a(1 + \tanh(\sqrt{2/\pi}(x + bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Still referring to FIG. 6, a "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like. CNN may include, without limitation, a deep neural network (DNN) extension, where a DNN is defined as a neural network with two or more hidden layers.

Still referring to FIG. 6, in some embodiments, a convolutional neural network may learn from images. In non-limiting examples, a convolutional neural network may perform tasks such as classifying images, detecting objects depicted in an image, segmenting an image, and/or processing an image. In some embodiments, a convolutional neural network may operate such that each node in an input layer is only connected to a region of nodes in a hidden layer. In some embodiments, the regions in aggregate may create a feature map from an input layer to the hidden layer. In some embodiments, a convolutional neural network may include a layer in which the weights and biases for all nodes are the same. In some embodiments, this may allow a convolutional neural network to detect a feature, such as an edge, across different locations in an image.

Figure 7:
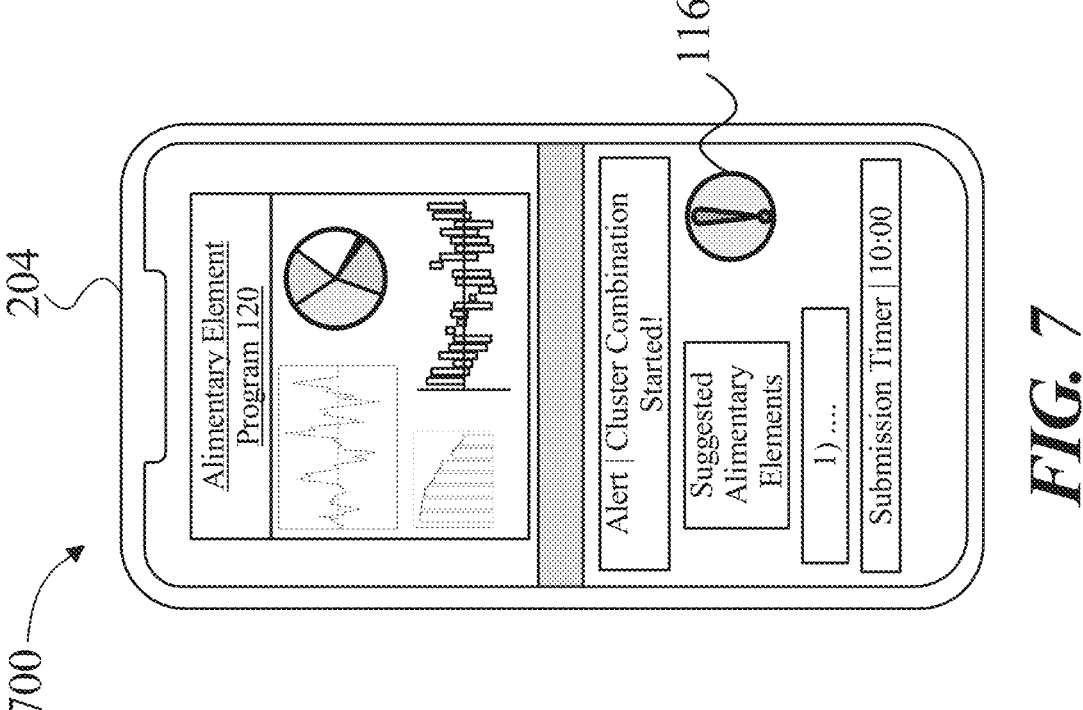
FIG. 7 is a diagrammatic representation of an exemplary embodiment of a user device providing an audiovisual notification.

Referring now to FIG. 7, a non-limiting exemplary embodiment 700 of a user device is illustrated. An audiovisual notification 116 may be transmitted via a graphical user interface, as described herein, to each user of the plurality of users, for instance and without limitation, within a particular radius of the single locale about submitting suitable alimentary elements to the cluster combination. Submitting "suitable" alimentary elements may refer to alimentary elements that correspond with the users' respective alimentary element programs 120, as described above. A "particular radius," as used in this disclosure, is a predetermined distance that system 100 may use to allow users to submit to a cluster 108. In non-limiting illustrative embodiments, a particular radius may be all users provided a login token for accessing a cluster 108, wherein the cluster 108 is started by a 'host' and the host may open the cluster 108 queue for alimentary element submission based on some criteria. In further non-limiting illustrative embodiments, host may send a login token to access the cluster 108 for ordering via the graphical user interface. A particular radius may refer to all users in an office, for instance on a particular floor of an office building. A particular radius may be all users connected to a particular network, such as an internet network, internet-of-things (IOT) network, or the like, such as the tenants of a shared apartment or members of a single-family household. A particular radius may refer to all users of an apartment building, wherein users may submit orders within a specified window of time for alimentary elements to be added to a cluster 108.

Still referring to FIG. 7, audiovisual notification 116 may be provided to a user within a particular radius wherein the notification alerts a user to a cluster combination queue. The audiovisual notification 116 may include information about submitting to the cluster 108, for instance with the cluster 108 will be submitted, which may be indicated by a count-down, timer, or the like.

Figure 8:
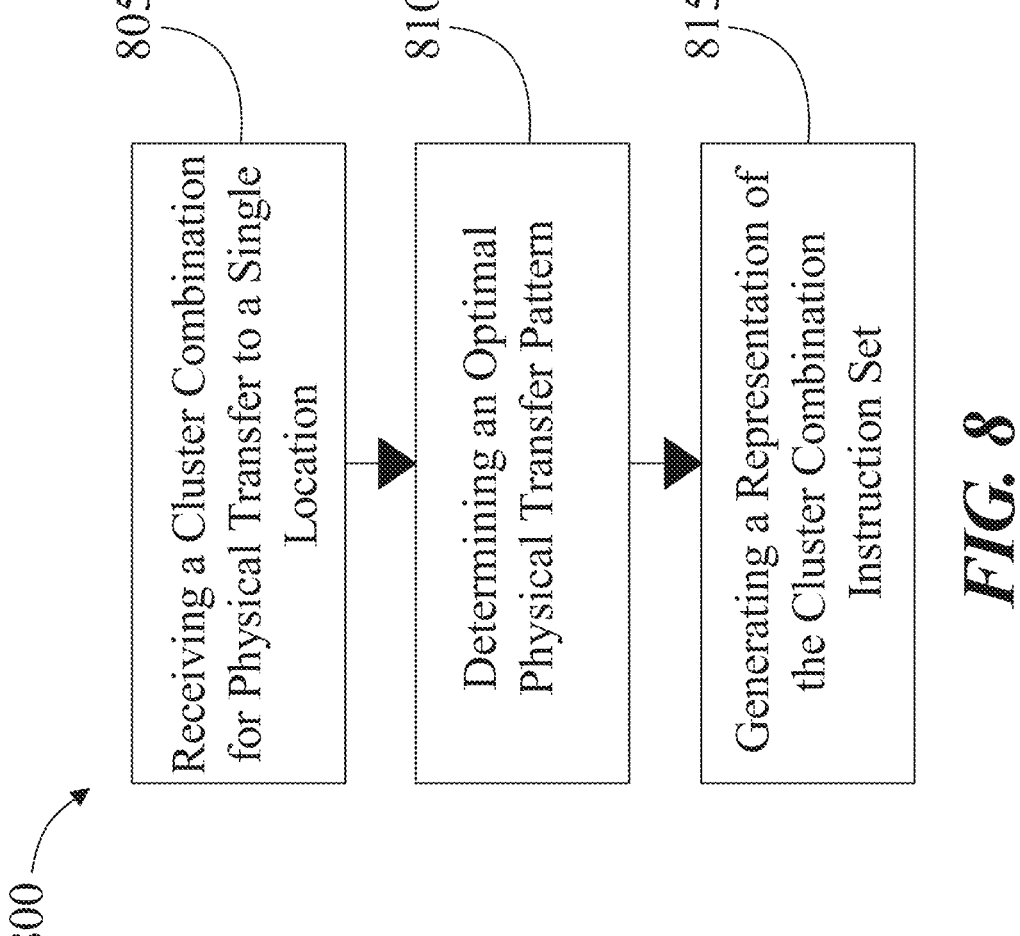
FIG. 8 is a block diagram of an exemplary embodiment of a method for generating a cluster instruction set.

Referring now to FIG. 8, an exemplary embodiment of a method 800 for generating a cluster instruction set is illustrated. At step 805, computing device 104 is configured for generating, as a function of a received cluster, a plurality of physical transfer paths from a distinct plurality of initiation points to a single locale, wherein the cluster comprises a cluster of a plurality of alimentary elements for physical transfer to the single locale. Receiving the cluster 108 may include generating an audiovisual notification 116 in response to receiving the cluster 108. The audiovisual notification 116 may address a user to submit an alimentary element to the cluster 180, wherein the alimentary element corresponds to an alimentary element program 120; this may be implemented, without limitation, as described above in reference to other FIGs.

Still referring to FIG. 8, at step 810, computing device 104 is configured for determining, as a function of the plurality of physical transfer paths, a physical transfer pattern 128, wherein determining the physical transfer pattern 128 includes generating an objective function of the plurality of physical transfer paths 140 as a function of a plurality of constraints 132, wherein minimizing the objective function minimizes the plurality of physical transfer resources, selecting a physical transfer path that minimizes objective function, and determining a cluster combination instruction set 172 for the physical transfer pattern 128 to the single destination. Determining the physical transfer pattern 128 may include generating a plurality of physical transfer paths 140 using a cluster machine-learning process 124, wherein the cluster machine-learning process 124 generates at least a physical transfer path for each alimentary element of the cluster 108. The plurality of constraints 132 may include geophysical data regarding each apparatus of the plurality of physical transfer apparatuses 112. Using the cluster machine-learning process 124 to determine the physical transfer pattern 128 may include generating an identifier 136 for each alimentary element of the cluster 108 of the plurality of alimentary elements, and determining, using the identifier 136 and the objective function, when each alimentary element originator should generate each alimentary element as a function of the plurality of constraints 132 and the plurality of physical transfer paths 140. Minimizing the plurality of physical transfer resources may include minimizing the number of physical transfer apparatuses utilized while minimizing the amount of time to perform the physical transfer pattern. Determining a physical transfer pattern may include using the cluster machine-learning process to identify at least an interchange node 144, wherein each interchange node 144 of the at least an interchange node 144 comprises a node location and a node time based on the physical locations of a plurality of physical transfer apparatuses 112 prior to physical transfer to a user location, calculating a change in candidate physical transfer path time and distance resulting from using the interchange node 144, and determining which physical transfer path and interchange node 144 pairing of the plurality of candidate transfer paths 140 minimizes the objective function; this may be implemented, without limitation, as described above in reference to other FIGs.

Continuing in reference to FIG. 8, determining a physical transfer pattern may include using a cluster machine-learning process 124 to generate a plurality of candidate transfer paths 140, wherein each candidate physical transfer path 140 is a geophysical path that a physical transfer apparatus 112 may follow to obtain an alimentary element and transfer to a single locale, generating at least an interchange node 144, wherein each interchange node 144 comprises a node location and a node time based on the physical locations of a plurality of physical transfer apparatuses 112 prior to physical transfer to a user location, calculating a change in candidate physical transfer path 140 time and distance resulting from using the interchange node 144, and determining which physical transfer path and interchange node 144 pairing of the plurality of candidate transfer paths represents an optimal physical transfer. Determining which transfer path and interchange node 144 pairing represents an optimal physical transfer path may include ranking, using a ranking machine-learning process, a plurality of transfer paths and a plurality of interchange nodes 144, wherein ranking is based on physical transfer resources and physical transfer time, and selecting the optimal physical transfer path which minimizes physical transfer resources and physical transfer time as a function of the ranking; this may be implemented, without limitation, as described above in reference to other FIGs.

Continuing in reference to FIG. 8, at step 815, computing device 104 is configured for generating a representation of the cluster instruction set 172 via a graphical user interface to at least a physical transfer apparatus 112 and the plurality of alimentary element originators. Determining a cluster instruction set 172 for a selected physical transfer pattern 128 to a single destination may include generating preparation instructions as a function of the selected physical transfer pattern 128 and transmitting the preparation instructions to at least an alimentary element originator. Determining a cluster instruction set 172 for a selected physical transfer pattern 128 to a single destination may include generating physical transfer instructions as a function of the selected physical transfer pattern 128 and transmitting the physical transfer instructions to at least a physical transfer apparatus 112; this may be implemented, without limitation, as described above in reference to other FIGs.

Figure 9:
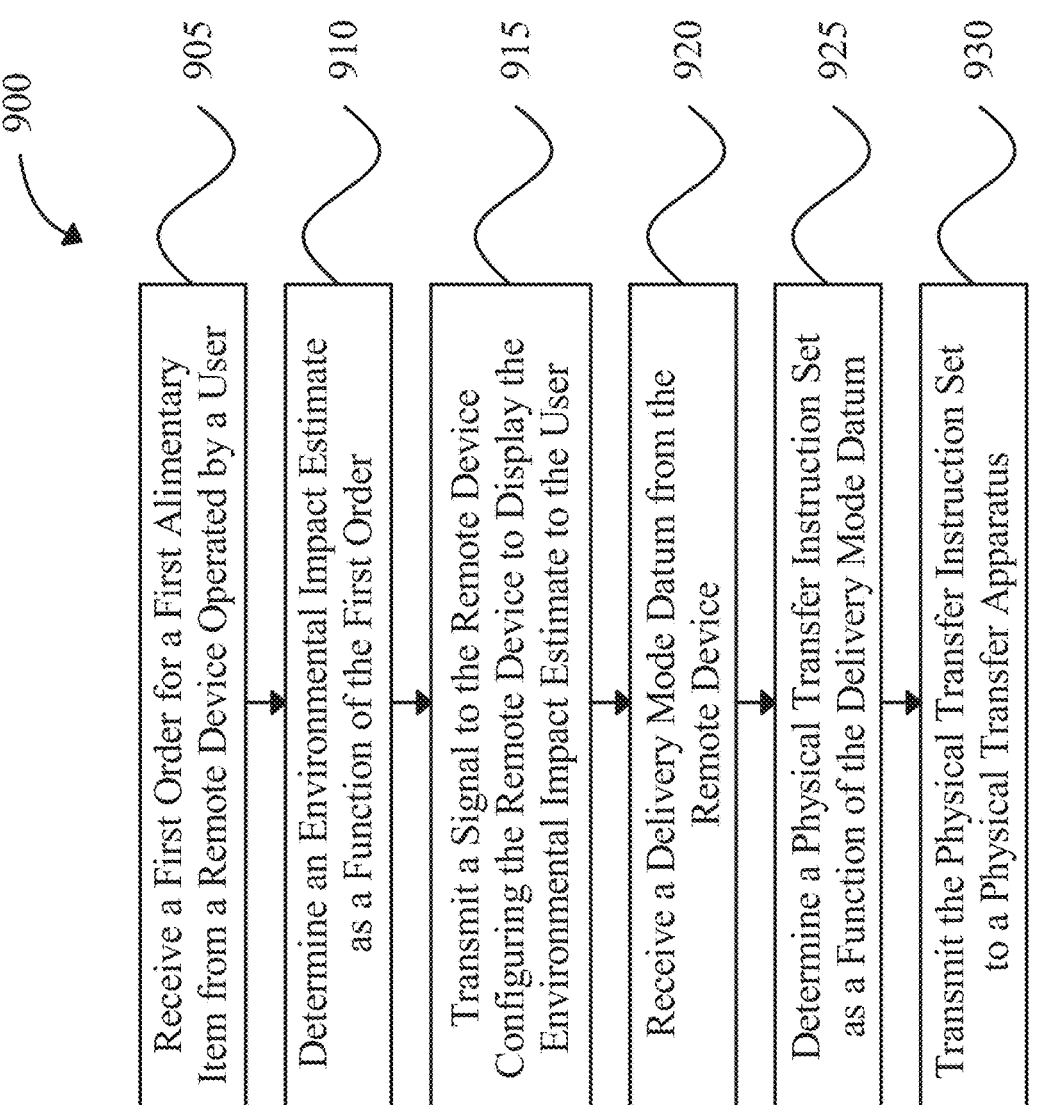
FIG. 9 is a block diagram of an exemplary embodiment of a method for generating a physical combination instruction set.

Referring now to FIG. 9, an exemplary embodiment of a method 900 of determining a physical combination instruction set is illustrated. One or more steps if method 900 may be implemented, without limitation, as described with reference to other figures. One or more steps of method 900 may be implemented, without limitation, using at least a processor.

Still referring to FIG. 9, in some embodiments, method 900 may include receiving a first order for a first alimentary item from a remote device operated by a user 905.

Still referring to FIG. 9, in some embodiments, method 900 may include determining an environmental impact estimate as a function of the first order 910. In some embodiments, the environmental impact estimate comprises an estimate of carbon emissions from a future transport of the first alimentary item. In some embodiments, the environmental impact estimate comprises an estimate of environmental impact from packing of the first alimentary item. In some embodiments, the environmental impact estimate comprises an estimate of environmental impact from production of the first alimentary item.

Still referring to FIG. 9, in some embodiments, method 900 may include transmitting a signal to the remote device configuring the remote device to display the environmental impact estimate to the user 915.

Still referring to FIG. 9, in some embodiments, method 900 may include receiving a delivery mode datum from the remote device 920. In some embodiments, the delivery mode datum may include an urgency datum, wherein the method further includes determining whether the first alimentary item is to be delivered alone or as part of a larger cluster of alimentary items as a function of the urgency datum. In some embodiments, the method further comprises, upon receiving the delivery mode datum, waiting before transmitting the physical transfer instruction set to the physical transfer apparatus. In some embodiments, the method further comprises, upon receiving the delivery mode datum, waiting until a second order for a second alimentary item to be delivered within the area is received.

Still referring to FIG. 9, in some embodiments, method 900 may include determining a physical transfer instruction set as a function of the delivery mode datum 925. In some embodiments, determining the physical transfer instruction set may include determining an area for additional users to submit orders for alimentary items to a cluster; and receiving, as a function of the area, orders for alimentary items. In some embodiments, determining the physical transfer instruction set may further include generating, as a function of the cluster, a plurality of physical transfer paths from a series of distinct initiation points to a single locale, wherein the cluster comprises a cluster of a plurality of orders for alimentary items originating from a plurality of establishments for physical transfer to the single locale at the same time; and determining, as a function of the plurality of physical transfer paths, the physical transfer instruction set.

Still referring to FIG. 9, in some embodiments, method 900 may include transmitting the physical transfer instruction set to a physical transfer apparatus 930.

Still referring to FIG. 9, in some embodiments, method 900 may further include determining a modified environmental impact estimate as a function of the environmental impact estimate and the second order; and transmitting a signal to the remote device configuring the remote device to display the modified environmental impact estimate to the user.

Still referring to FIG. 9, in some embodiments, method 900 may further include determining a demand estimate, wherein the environmental impact estimate is determined as a function of the demand estimate.

Figure 10:
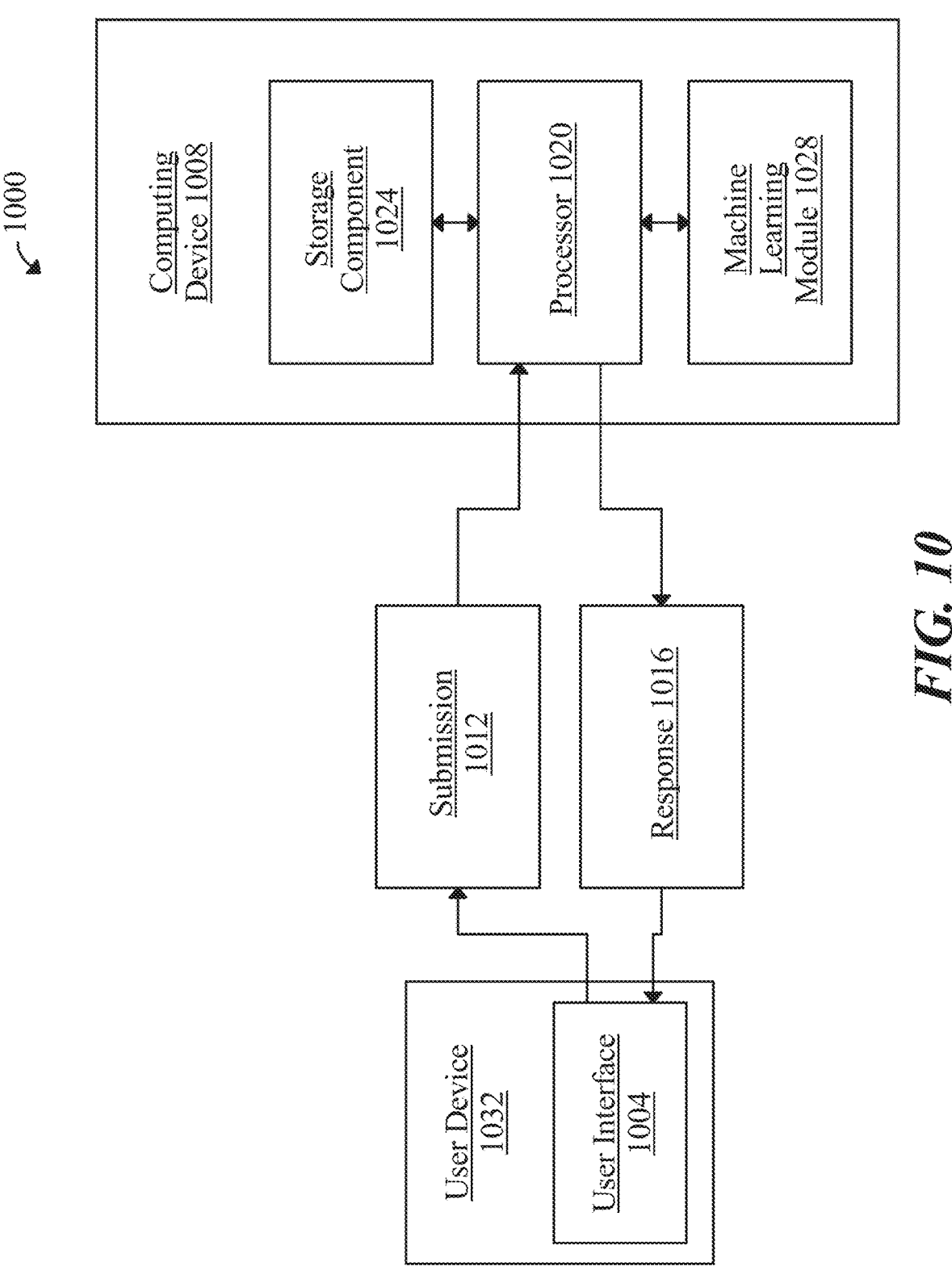
FIG. 10 is a block diagram of an exemplary chatbot system.

Now referring to FIG. 10, in some embodiments, apparatus 100 may communicate with user and/or instructor using a chatbot. According to some embodiments, user interface 1004 on user device 1032 may be communicative with a computing device 1008 that is configured to operate a chatbot. In some embodiments, user interface 1004 may be local to user device 1032. In some embodiments, user interface 1004 may be local to computing device 1008. Alternatively, or additionally, in some cases, user interface 1004 may remote to user device 1032 and communicative with user device 1032, by way of one or more networks, such as without limitation the internet. Alternatively, or additionally, one or more user interfaces may communicate with computing device 1008 using telephonic devices and networks, such as without limitation fax machines, short message service (SMS), or multimedia message service (MMS). Commonly, user communicate with computing device 1008 using text-based communication, for example without limitation using a character encoding protocol, such as American Standard for Information Interchange (ASCII). Typically, user interfaces conversationally interface with a chatbot, by way of at least a submission, from a user interface to the chatbot, and a response, from the chatbot to the user interface. For example, user interface 1004 may interface with a chatbot using submission 1012 and response 1016. In some embodiments, submission 1012 and/or response 1016 may use text-based communication. In some embodiments, submission 1012 and/or response 1016 may use audio communication.

Still referring to FIG. 10, submission 1012, once received by computing device 1008 operating a chatbot, may be processed by a processor 1020. In some embodiments, processor 1020 processes submission 1012 using one or more of keyword recognition, pattern matching, and natural language processing. In some embodiments, processor employs real-time learning with evolutionary algorithms. In some cases, processor 1020 may retrieve a pre-prepared response from at least a storage component 1024, based upon submission 1012. Alternatively or additionally, in some embodiments, processor 1020 communicates a response 1016 without first receiving a submission, thereby initiating conversation. In some cases, processor 1020 communicates an inquiry to user interface 1004; and processor 1020 is configured to process an answer to the inquiry in a following submission from the user interface. In some cases, an answer to an inquiry present within a submission from a user device may be used by computing device 1008 as an input to another function. In some embodiments, computing device 1008 may include machine learning module 1028. Machine learning module 1028 may include any machine learning models described herein. In some embodiments, submission 1012 may be input into a trained machine learning model within machine learning module 1028. In some embodiments, submission 1012 may undergo one or more processing steps before being input into a machine learning model. In some embodiments, submission 1012 may be used to train a machine learning model within machine learning module 1028.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
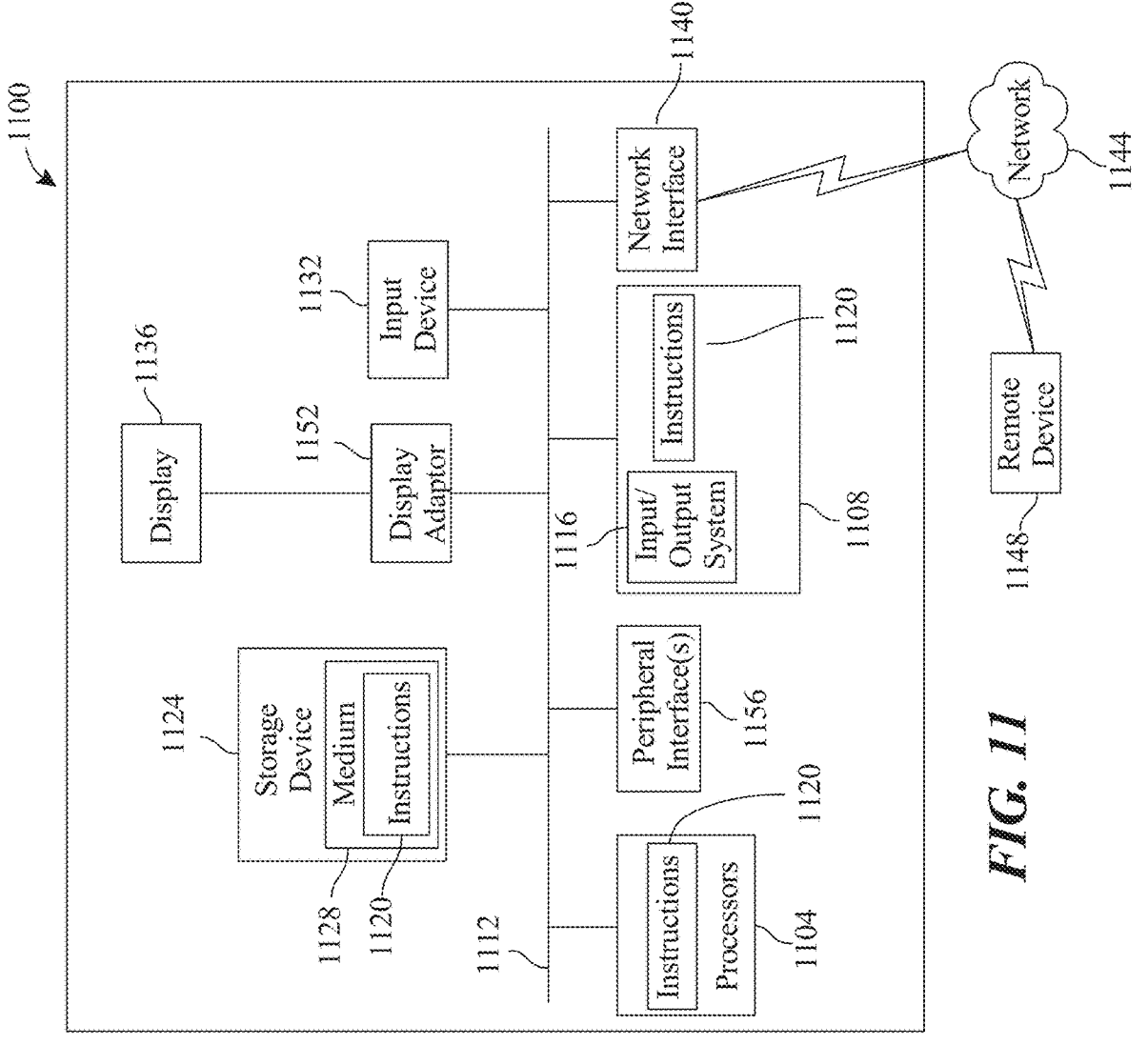
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIRE-WIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for determining a physical combination instruction set, the system comprising a computing device, wherein the computing device is configured to:

receive a first order for a first alimentary item from a remote device operated by a user;

determine an environmental impact estimate as a function of the first order;

transmit a signal to the remote device configuring the remote device to display the environmental impact estimate to the user;

receive a delivery mode datum from the remote device;

determine a physical transfer instruction set as a function of the delivery mode datum, wherein determining the physical transfer instruction set comprises:

determining an area for additional users to submit orders for alimentary items to a cluster of alimentary elements; and receiving, as a function of the area, orders for alimentary items; and transmit the physical transfer instruction set to a physical transfer apparatus.

2. The system of claim 1, wherein determining the physical transfer instruction set further comprises:

generating, as a function of the cluster of the alimentary elements, a plurality of physical transfer paths from a series of distinct initiation points to a single locale, wherein the cluster comprises a cluster of a plurality of orders for alimentary items originating from a plurality of establishments for physical transfer to the single locale at a same time; and determining, as a function of the plurality of physical transfer paths, the physical transfer instruction set.

3. The system of claim 1, wherein the environmental impact estimate comprises an estimate of carbon emissions from a future transport of the first alimentary item.

4. The system of claim 1, wherein the environmental impact estimate comprises an estimate of environmental impact from packing of the first alimentary item.

5. The system of claim 1, wherein the environmental impact estimate comprises an estimate of environmental impact from production of the first alimentary item.

6. The system of claim 1, wherein the delivery mode datum comprises an urgency datum, wherein the computing device is configured to determine whether the first alimentary item is to be delivered alone or as part of a larger cluster of alimentary items as a function of the urgency datum.

7. The system of claim 1, wherein the delivery mode datum configures the computing device to wait before transmitting the physical transfer instruction set to the physical transfer apparatus.

8. The system of claim 7, wherein the delivery mode datum configures the computing device to wait until a second order for a second alimentary item to be delivered within the area is received.

9. The system of claim 8, wherein the computing device is configured to:

determine a modified environmental impact estimate as a function of the environmental impact estimate and the second order; and transmit a signal to the remote device configuring the remote device to display the modified environmental impact estimate to the user.

10. The system of claim 1, wherein the computing device is configured to determine a demand estimate, wherein the environmental impact estimate is determined as a function of the demand estimate.

11. A method of determining a physical combination instruction set, the method comprising:

using at least a processor, receiving a first order for a first alimentary item from a remote device operated by a user;

using at least a processor, determining an environmental impact estimate as a function of the first order;

using at least a processor, transmitting a signal to the remote device configuring the remote device to display the environmental impact estimate to the user;

using at least a processor, receiving a delivery mode datum from the remote device;

using at least a processor, determining a physical transfer instruction set as a function of the delivery mode datum, wherein determining the physical transfer instruction set comprises:

determining an area for additional users to submit orders for alimentary items to a cluster of alimentary elements; and receiving, as a function of the area, orders for alimentary items; and using at least a processor, transmitting the physical transfer instruction set to a physical transfer apparatus.

12. The method of claim 11, wherein determining the physical transfer instruction set further comprises:

generating, as a function of the cluster of the alimentary elements, a plurality of physical transfer paths from a series of distinct initiation points to a single locale, wherein the cluster comprises a cluster of a plurality of orders for alimentary items originating from a plurality of establishments for physical transfer to the single locale at a same time; and determining, as a function of the plurality of physical transfer paths, the physical transfer instruction set.

13. The method of claim 11, wherein the environmental impact estimate comprises an estimate of carbon emissions from a future transport of the first alimentary item.

14. The method of claim 11, wherein the environmental impact estimate comprises an estimate of environmental impact from packing of the first alimentary item.

15. The method of claim 11, wherein the environmental impact estimate comprises an estimate of environmental impact from production of the first alimentary item.

16. The method of claim 11, wherein the delivery mode datum comprises an urgency datum, wherein the method further comprises determining whether the first alimentary item is to be delivered alone or as part of a larger cluster of alimentary items as a function of the urgency datum.

17. The method of claim 11, wherein the method further comprises, upon receiving the delivery mode datum, waiting before transmitting the physical transfer instruction set to the physical transfer apparatus.

18. The method of claim 17, wherein the method further comprises, upon receiving the delivery mode datum, waiting until a second order for a second alimentary item to be delivered within the area is received.

19. The method of claim 18, further comprising:

using at least a processor, determining a modified environmental impact estimate as a function of the environmental impact estimate and the second order; and using at least a processor, transmitting a signal to the remote device configuring the remote device to display the modified environmental impact estimate to the user.

20. The method of claim 11, further comprising determining a demand estimate, wherein the environmental impact estimate is determined as a function of the demand estimate.

* * * * *